United States Patent
Ichieda

(10) Patent No.: US 9,904,414 B2
(45) Date of Patent: Feb. 27, 2018

(54) DISPLAY DEVICE, AND METHOD OF CONTROLLING DISPLAY DEVICE

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 14/098,638

(22) Filed: Dec. 6, 2013

(65) Prior Publication Data
US 2014/0160076 A1    Jun. 12, 2014

(30) Foreign Application Priority Data

Dec. 10, 2012  (JP) ................................. 2012-269090
Jan. 21, 2013  (JP) ................................. 2013-008093

(51) Int. Cl.
*G06F 3/042* (2006.01)
*G06F 3/0488* (2013.01)

(52) U.S. Cl.
CPC ........ *G06F 3/0425* (2013.01); *G06F 3/04883* (2013.01); *G06F 2203/04104* (2013.01)

(58) Field of Classification Search
CPC ...... G06F 3/0425; G06F 3/042; G06F 3/0426; G06F 3/04883; G06F 2203/04104
USPC ...................................................... 345/175
See application file for complete search history.

(56) References Cited

U.S. PATENT DOCUMENTS

| | | | | |
|---|---|---|---|---|
| 4,686,522 A * | 8/1987 | Hernandez | ............ | G06F 3/0481 345/160 |
| 5,392,058 A * | 2/1995 | Tagawa | ................ | B25J 19/0012 345/103 |
| 5,509,114 A * | 4/1996 | Moran | ................ | G06F 3/04883 345/443 |
| 6,788,289 B2 * | 9/2004 | Kitazawa | .............. | G06F 3/0425 345/156 |
| 6,829,394 B2 * | 12/2004 | Hiramatsu | ........... | G06K 9/2054 345/157 |
| 7,555,164 B2 * | 6/2009 | Lin | ........................ | G06F 3/0425 345/581 |
| 7,728,823 B2 * | 6/2010 | Lyon | ...................... | G06F 3/044 178/18.01 |
| 7,810,050 B2 * | 10/2010 | Hirai | ..................... | G06F 3/0425 345/173 |

(Continued)

FOREIGN PATENT DOCUMENTS

JP  09-311764 A   12/1997
JP  2004-272433 A  9/2004

(Continued)

*Primary Examiner* — Michael J Jansen, II
(74) *Attorney, Agent, or Firm* — ALG Intellectual Property, LLC

(57) ABSTRACT

A projector includes a projection unit adapted to display an image based on image data supplied from a PC or an image processing unit as an image supply section, a position detection unit adapted to detect an operation by a pointing body, a coordinate conversion section or an output section adapted to output the pointed position to the image supply section in the case in which the operation is detected by the position detection unit, and an operation determination section adapted to restrict the output of the pointed position in the case in which the operation detected by the position detection unit is an operation satisfying a condition set in advance.

6 Claims, 10 Drawing Sheets

(56) References Cited

U.S. PATENT DOCUMENTS

| | | | |
|---|---|---|---|
| 7,877,707 B2* | 1/2011 | Westerman | G06F 3/04883 715/863 |
| 7,880,720 B2 | 2/2011 | Hill et al. | |
| 8,330,716 B2* | 12/2012 | Nakaoka | G06F 3/0346 345/157 |
| 8,407,606 B1* | 3/2013 | Davidson | G06F 3/0488 345/173 |
| 8,427,511 B2* | 4/2013 | Shin | G06F 1/1639 345/1.1 |
| 8,591,039 B2* | 11/2013 | Morrison | H04N 9/3185 348/745 |
| 8,614,670 B2* | 12/2013 | Nakaoka | G06F 3/0346 345/156 |
| 8,730,210 B2* | 5/2014 | Viswanathan | G06F 3/0416 345/175 |
| 8,818,027 B2* | 8/2014 | Forutanpour | G06F 3/017 345/156 |
| 8,860,675 B2* | 10/2014 | Wang | G06F 3/041 345/156 |
| 9,021,402 B1* | 4/2015 | Li | G06F 3/04883 715/863 |
| 9,411,498 B2* | 8/2016 | Hinckley | G06F 3/03545 |
| 2001/0022861 A1* | 9/2001 | Hiramatsu | G06F 3/0425 382/291 |
| 2001/0028341 A1* | 10/2001 | Kitazawa | G06F 3/0425 345/156 |
| 2005/0168448 A1* | 8/2005 | Simpson | G06F 3/0418 345/173 |
| 2006/0010400 A1* | 1/2006 | Dehlin et al. | 715/856 |
| 2006/0036971 A1* | 2/2006 | Mendel | G06F 3/04812 715/856 |
| 2006/0066588 A1* | 3/2006 | Lyon | G06F 3/0488 345/173 |
| 2006/0139362 A1* | 6/2006 | Lin | G06F 3/0425 345/581 |
| 2007/0146320 A1* | 6/2007 | Kubota | G06F 3/0425 345/157 |
| 2008/0163131 A1* | 7/2008 | Hirai | G06F 3/0425 715/863 |
| 2009/0103780 A1 | 4/2009 | Nishihara et al. | |
| 2010/0031202 A1* | 2/2010 | Morris | G06F 3/04883 715/863 |
| 2010/0031203 A1* | 2/2010 | Morris | G06F 3/04883 715/863 |
| 2010/0103330 A1* | 4/2010 | Morrison | G06F 3/0412 348/744 |
| 2010/0156785 A1* | 6/2010 | Nakaoka | G06F 3/0346 345/157 |
| 2010/0156788 A1* | 6/2010 | Nakaoka | G06F 3/0383 345/158 |
| 2011/0109554 A1* | 5/2011 | Boissier | G06F 3/03545 345/166 |
| 2011/0122080 A1* | 5/2011 | Kanjiya | G06F 3/04883 345/173 |
| 2011/0241988 A1* | 10/2011 | Bensler | G06F 3/03545 345/158 |
| 2011/0243380 A1* | 10/2011 | Forutanpour | G06F 3/017 382/103 |
| 2012/0017147 A1* | 1/2012 | Mark | G06F 1/1639 715/702 |
| 2012/0044140 A1* | 2/2012 | Koyama et al. | 345/157 |
| 2012/0062477 A1* | 3/2012 | Lin | G06F 3/017 345/173 |
| 2012/0127074 A1* | 5/2012 | Nakamura | G06F 3/017 345/158 |
| 2012/0162444 A1* | 6/2012 | Suda | G06F 3/03545 348/207.1 |
| 2012/0194545 A1* | 8/2012 | Shibata | G06F 3/0425 345/629 |
| 2012/0218203 A1* | 8/2012 | Kanki | G06F 3/0485 345/173 |
| 2012/0235906 A1* | 9/2012 | Ryoo | G06F 3/0346 345/158 |
| 2012/0236026 A1* | 9/2012 | Hinckley | G06F 3/03545 345/629 |
| 2012/0320007 A1 | 12/2012 | Fujiwara | |
| 2012/0326995 A1* | 12/2012 | Zhang | G06F 3/0425 345/173 |
| 2013/0016126 A1* | 1/2013 | Wang | G06F 3/041 345/650 |
| 2013/0069870 A1 | 3/2013 | Ichieda | |
| 2013/0069994 A1* | 3/2013 | Nishigaki | H04N 9/3129 345/690 |
| 2013/0093672 A1 | 4/2013 | Ichieda | |
| 2013/0100075 A1* | 4/2013 | Viswanathan | G06F 3/0416 345/175 |
| 2013/0106908 A1* | 5/2013 | Ichieda | G09G 3/02 345/629 |
| 2013/0162607 A1* | 6/2013 | Ichieda | G03B 21/14 345/204 |
| 2013/0241820 A1* | 9/2013 | Keh | G06F 3/1454 345/156 |
| 2013/0241887 A1* | 9/2013 | Sharma | G06F 3/0426 345/175 |
| 2013/0257811 A1* | 10/2013 | Usuda | G06F 3/0425 345/175 |
| 2013/0314439 A1* | 11/2013 | Ota | G06T 11/60 345/629 |
| 2013/0346923 A1* | 12/2013 | Ku | G06F 3/04842 715/835 |
| 2014/0098224 A1* | 4/2014 | Zhang | G01B 11/022 348/135 |
| 2014/0104206 A1* | 4/2014 | Anderson | G06F 3/017 345/173 |
| 2014/0160076 A1* | 6/2014 | Ichieda | G06F 3/0425 345/175 |
| 2014/0218300 A1 | 8/2014 | Muraki et al. | |
| 2014/0313166 A1* | 10/2014 | Rattray | H04N 9/3179 345/175 |
| 2015/0220255 A1* | 8/2015 | Maeda | H04N 1/00411 715/764 |
| 2015/0346945 A1 | 12/2015 | Kanki | |

FOREIGN PATENT DOCUMENTS

| | | |
|---|---|---|
| JP | 2006-285167 A | 10/2006 |
| JP | 2008-003802 A | 1/2008 |
| JP | 2010-139686 A | 6/2010 |
| JP | 2012-168619 A | 9/2012 |
| JP | 2012-185631 A | 9/2012 |
| JP | 2013-064917 A | 4/2013 |
| JP | 2013-088840 A | 5/2013 |

* cited by examiner

DISPLAY DEVICE, AND METHOD OF CONTROLLING DISPLAY DEVICE

The entire disclosure of Japanese Patent Application Nos. 2012-269090, filed Dec. 10, 2012, and 2013-008093, filed Jan. 21, 2013 are expressly incorporated by reference herein.

BACKGROUND

1. Technical Field

The present invention relates to a display device for displaying an image on a display surface, and a method of controlling a display device.

2. Related Art

In the past, a display device such as a projector has been configured so as to perform a variety of functions using a remote-control device or the like (see, e.g., JP-A-2006-285167 (Document 1)). The device described in Document 1 performs an action of, for example, switching images supplied from a plurality of video sources in accordance with an operation of the remote-control device. Further, in the past, there has been proposed a display device in which a position input operation is performed using a pen-shaped device or the like (see, e.g., JP-A-2004-272433 (Document 2)).

As described in Document 2, in the device for performing the position input operation, it is difficult to operate all of the functions by the position input operation, and in some cases, an operation of the remote-control device is required for a control function such as a function of switching the image to be displayed. In such cases, the user is required to operate both of the device used for the position input operation and the remote-control device or the like, which is cumbersome.

SUMMARY

An advantage of some aspects of the invention is to solve the problem of the related art mentioned above to achieve improvement of the operability in performing a variety of functions of a display device.

A display device according to an aspect of the invention includes a display adapted to display an image based on image data supplied from an image supply section on a display surface, a detector adapted to detect an operation with a pointing body to the display surface, an output device adapted to output a position where the operation is performed to the image supply section as a pointed position in a case in which the operation is detected by the detector, and a controller adapted to restrict output of the pointed position by the output device in a case in which the operation detected by the detector is an operation satisfying a condition set in advance.

According to the aspect of the invention, since the output of the pointed position to the image supply section is restricted in the case in which the operation satisfying the condition set in advance is performed by the user with the pointing body, it becomes possible for the user to subsequently perform the instruction to the display with the pointing body. Thus, it is possible to achieve improvement in operability in the case of performing the operation using the pointing body.

Further, according to an aspect of the invention, the function of changing the display state is performed in the case in which the operation satisfying the condition set in advance is performed by the user with the pointing body. Therefore, since the user can change the display state without changing the pointing body gripped by hand to another device or the like, it is possible to achieve improvement in operability when changing the display state of the display device.

Further, according to an aspect of the invention, the detector detects the finger of the user as the pointing body, and therefore the user can intuitively operates by hand without being required to prepare a device functioning as the pointing body. Thus, further improvement in operability can be achieved.

Further, according to an aspect of the invention, the function to be performed can be changed based on the number of the fingers detected, and therefore it is possible to assign a variety of functions to the operations by the fingers. Thus, since the user can perform a variety of operations with the fingers, further improvement in operability can be achieved.

Further, according to an aspect of the invention, the specificity of the operation can be enhanced by setting the operation having the trajectory of the pointed position having the predetermined shape to the operation satisfying the condition set in advance, and therefore there is no chance that the control of the function related to the display state is performed without the user's intent, and further improvement in operability can be achieved.

Further, according to an aspect of the invention, the function of the display device becomes controllable in the case in which the operation having the predetermined configuration lasts for the time set in advance using the pointing body, and therefore the function of the display device can easily be controlled using the operation with the pointing body. Further, by setting the temporal limitation, it can be prevented that the user mistakenly controls the function of the display device. Thus, it is possible to achieve improvement in operability in the case of performing the operation using the pointing body.

Further, according to an aspect of the invention, the pointed position by the pointing body can also be used by the device or the processing section other than the image supply section.

Further, according to an aspect of the invention, the pointed position by the pointing body can be used as the information for controlling the function of the display device, and further improvement in operability can be achieved.

Further, according to an aspect of the invention, in the case in which the display device performs the control of displaying the image on the display surface using the image supply device located outside the display device, the function of the display device can easily be controlled using the operation with the pointing body.

Further, according to an aspect of the invention, it becomes that the pointed position by the pointing body is output to the display controller provided to the display device in accordance with the operation with the pointing body, and therefore it becomes possible to perform the display for controlling the function of the display device by the display controller.

Further, according to an aspect of the invention, the operation for making a transition to the state in which the function of the display device can be controlled is an easy operation so specific as to be easily distinguished from other operations. Therefore, it becomes possible to assign another function to an operation having a similar configuration to the predetermined configuration providing the operation fails to reach the time set in advance, for example. Thus, further improvement in operability can be achieved.

Further, according to an aspect of the invention, the range set in advance can be set separately from the unit by which the detector can detect the pointed position, and therefore the condition for detecting the operation having the predetermined configuration can flexibly be set without being limited by the specifications in detecting the pointed position.

Further, according to an aspect of the invention, the output of the pointed position to the image supply section is switched based on the duration of the operation having the predetermined configuration, and therefore unnecessary output of the pointed position and unnecessary operation of the image supply section are eliminated to thereby achieve improvement in efficiency.

A method of controlling a display device according to another aspect of the invention is a method of controlling a display device adapted to display an image based on image data supplied from an image supply section on a display surface, including: detecting an operation with a pointing body to the display surface, outputting, in a case in which the operation is detected, a position where the operation is detected to the image supply section as a pointed position, and restricting, in a case in which the operation detected is an operation satisfying a condition set in advance, output of the pointed position.

According to the aspect of the invention, since the output of the pointed position to the image supply section is restricted in the case in which the operation satisfying the condition set in advance is performed by the user with the pointing body, it becomes possible for the user to subsequently perform the instruction to the display with the pointing body. Thus, it is possible to achieve improvement in operability in the case of performing the operation using the pointing body.

According to an aspect of the invention, the user can control the function related to the display state without changing the pointing body gripped by hand to another device or the like, and thus, improvement in operability can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment to which the invention is applied will hereinafter be explained with reference to the accompanying drawings.

Figure 1:
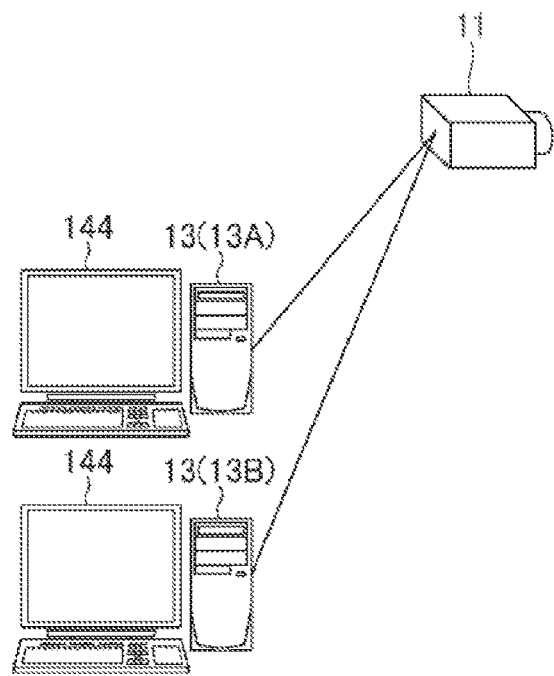
FIG. 1 is a diagram showing a configuration of a display system according to a first embodiment of the invention.
Figure 1:
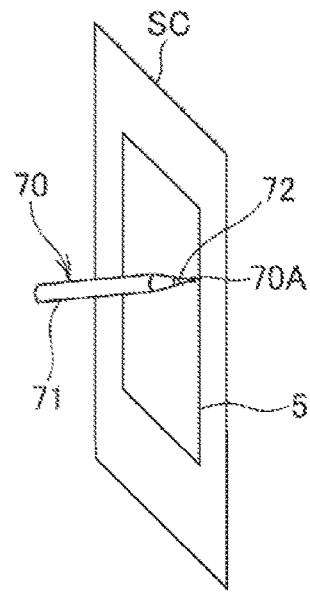

FIG. 1 is a diagram showing a configuration of a display system 10 using a projector 11 according to the first embodiment.

The projector 11 as a display device is connected to a personal computer (PC) 13 as an image supply section via an image signal cable or the like in a wired manner. The PC 13 has a monitor 144, and outputs image data of the image identical to the image, which is presently displayed on the monitor 144, to the projector 11, for example. Although two PC 13 are shown in FIG. 1, the number of PC 13, which are allowed to be connected to the display system 10, is not particularly limited.

The projector 11 projects the display image on a screen SC as a projection surface (a display surface) based on the image data input thereto. The image data input from the PC 13 can be either of moving image (video) data and still image data, and the projector 11 is capable of projecting either of the moving image and the still image based on the image data input thereto. Further, the projector 11 is connected to the PC 13 via a communication line for transmitting a control signal such as a USB cable or a LAN cable in addition to the image signal cable and so on for transmitting the image data, and transmitting and receiving control data and so on with the PC 13 via the communication line. It should be noted that it is also possible to use a wireless communication line as the communication line for transmitting the control signal. Further, it is also possible to adopt a configuration of transmitting the image data and the control data superimposed with each other on a single cable connecting the PC 13 and the projector 11 to each other.

As the screen SC, a wall surface itself can be used besides a curtain or a plate installed on the wall surface or a floor surface.

As shown in FIG. 1, a range (area) on the screen SC, to which the projector 11 can project an image, is defined as a displayable area 5. It should be noted that in the case in which the projector 11 performs a keystone correction for correcting the keystone distortion generated when projecting an image to the screen SC from an oblique direction, the rectangular area obtained by the correction is defined as the displayable area 5.

Further, although not shown in the drawings, it is also possible to connect image supply devices such as a DVD player or a video recorder to the projector 11 as the image supply sections besides the plurality of PC 13. Further, the projector 11 can also have a configuration incorporating the image supply sections. In other words, it is also possible to adopt a configuration of generating the image data to be projected by the projector 11 using the circuit incorporated in the projector 11.

The projector 11 is capable of performing single picture display for disposing a single display area in the displayable area 5 and displaying an image based on the image data input from a single image supply section, and multi-picture display for disposing a plurality of display areas in the displayable area 5 and displaying the image data input from a plurality of image supply sections respectively on the plurality of display areas.

In the display system 10, it is possible to perform the position pointing operation using a pointing body 70 on the screen SC. The pointing body 70 is, for example, a pen-shaped device, and the user uses the device while gripping a shaft section 71 with the hand so as to press the tip of the device against the screen SC. The tip of the pointing body 70 is provided with an operation switch 72 for detecting the pressing operation, and in the case in which the user presses the tip of the pointing body 70 against the screen SC, the operation switch 72 is set to the ON state.

The projector 11 is capable of detecting the tip position of the pointing body 70 as a pointed position 70A, and further detecting the transitions of the operation switch 72 in the case in which the operation switch 72 is set to the ON state, or switched from the ON state to the OFF state by the operation of the user. The projector 11 is capable of performing a process of processing the control data representing the coordinate of the pointed position 70A thus detected and the data representing the operation state of the operation switch 72 using a circuit incorporated in the projector 11, and then, for example, drawing an image based on the coordinate of the pointed position 70A thus detected. Further, the projector 11 is also capable of outputting the control data representing the coordinate of the pointed position 70A and so on to the PC 13.

Further, in the display system 10, it is possible to perform the operation using fingers (maniphalanx) of the user as the pointing body instead of the pen-shaped pointing body 70. The projector 11 detects the positions of the fingers of the user as the pointed positions. Further, the projector 11 is capable of detecting the contact positions in the case in which the fingers of the user have contact with the screen SC. The projector 11 is capable of detecting either the positions of the fingers of the user or the contact positions at which the fingers have contact with the screen SC as the pointed positions, and further, which one are to be set to the pointed positions can be set. In this case, the projector 11 can not only detect the operation with a single finger of the user, but also detect all of the pointed positions by a plurality of fingers in the case in which the operation is performed with the plurality of fingers.

Figure 2:
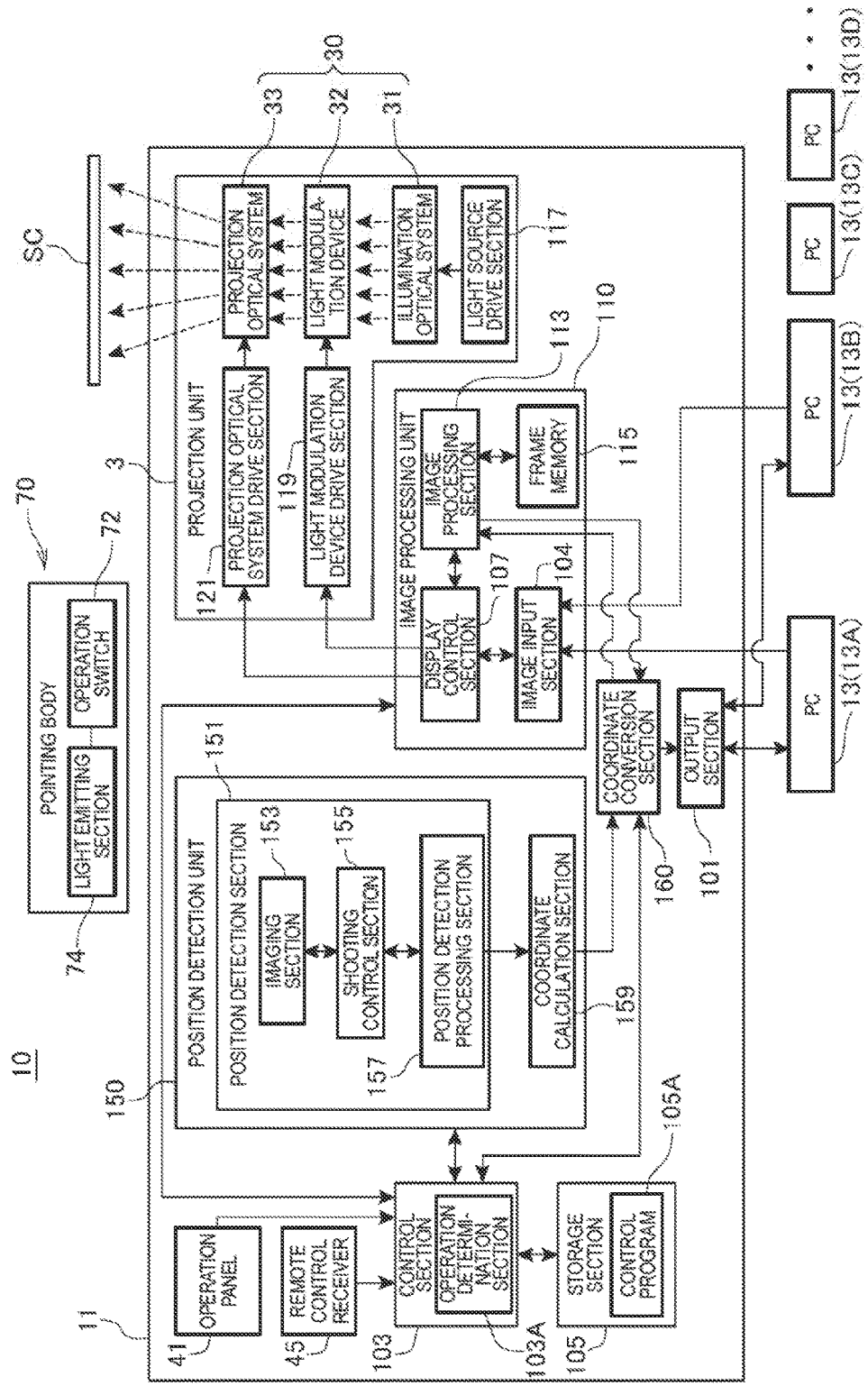
FIG. 2 is a functional block diagram of components constituting the display system.

FIG. 2 is a block diagram showing a functional configuration of the display system 10.

The projector 11 is provided with an image processing unit (a display controller) 110 for performing image processing for displaying an image on the screen SC based on the image data input from the PC 13, a projection unit (a display device) 3 for projecting the image processed by the image processing unit 110 to the screen SC, a position detection unit (a detector) 150 for detecting the pointed positions 70A of the pointing body 70 on the screen SC, and a control section 103 for controlling these components.

The control section 103 is composed of a CPU, a non-volatile memory, a RAM, and so on not shown, and reads out and then executes a control program 105A stored in a storage section 105 connected to the control section 103 to thereby control each section of the projector 11. The storage section 105 is formed of a magnetic or optical recording device, or a semiconductor storage element, and stores a variety of types of programs including the control program 105A, and data such as various setting values.

An operation panel 41 as an operation section, and a remote control receiver 45 for detecting an operation of a remote controller as the operation section are connected to the control section 103.

The operation panel 41 is provided with a variety of types of switches and indicator lamps, and is disposed to an exterior housing (not shown) of the projector 11. When a switch of the operation panel 41 is operated, an operation signal corresponding to the switch thus operated is output to the control section 103.

The remote control receiver 45 receives an infrared signal transmitted by the remote controller (not shown) used by the user as the operator of the projector 11 in accordance with a button operation. The remote control receiver 45 demodulates and then decodes the infrared signal received from the remote controller, and then outputs the operation signal representing the operation in the remote controller to the control section 103.

It should be noted that the operation of the projector 11 can also be performed by the PC 13 besides the pointing body 70, the operation panel 41, and the remote controller. On this occasion, the PC 13 outputs the control data for operating the projector 11 and functions as the operation section.

The control section 103 detects the operation of the user based on the operation signal input from the operation panel 41 or the remote control receiver 45, and then controls the projector 11 in accordance with this operation.

The projection section 30 is configured including an illumination optical system 31, a light modulation device 32 (a light modulator), and a projection optical system 33. The illumination optical system 31 is provided with a light source formed of, for example, a xenon lamp, a super-high pressure mercury lamp, or a light emitting diode (LED). Further, the illumination optical system 31 can also be provided with a reflector and an auxiliary reflector for guiding the light, which is emitted by the light source, to the light modulation device 32, a lens group (not shown) for improving the optical characteristics of the projection light, a polarization plate, or a photochromic element for reducing the light intensity of the light emitted by the light source.

The light modulation device 32 modulates the light from the illumination optical system 31 to form the image light. In the present embodiment, the case of configuring the light modulation device 32 using a transmissive liquid crystal panel will be cited as an example. In this configuration, the light modulation device 32 has three liquid crystal panels corresponding respectively to three primary colors of RGB, and the light emitted by the illumination optical system 31 is separated into colored lights of the three colors of RGB, and the colored lights respectively enter the corresponding liquid crystal panels. The colored lights, which have been modulated while passing through the respective liquid crystal panels, are combined by a combining optical system such as a cross dichroic prism, and are then output to the projection optical system 33.

The projection optical system 33 is provided with, for example, a lens or a lens group for performing expansion and contraction of the image to be projected and adjustment of the focus, a zoom controlling motor for driving the lens to control the level of the zoom, and a focus adjusting motor for performing the focus adjustment.

The projection unit 3 is provided with a projection optical system drive section 121, a light modulation device drive section 119, and a light source drive section 117 in addition to the projection section 30. The projection optical system drive section 121 drives the motors provided to the projection optical system 33 in accordance with the control by the display control section 107 of the image processing unit 110. The light modulation device drive section 119 drives the light modulation device 32 to perform drawing in accordance with the image signal output from the display control section 107. The light source drive section 117 drives the light source provided to the illumination optical system 31 in accordance with the control by the control section 103.

The image processing unit 110 is provided with an image input section 104 to be connected to the PC 13. The image input section 104 is an interface for the variety of types of image supply section including the PC 13 to input the image data, and there can be used a general-purpose interface such as a DVI interface, a USB interface, a LAN interface, an HDMI (registered trademark) interface, or a Bluetooth (registered trademark) interface. Further, it is also possible to input the image data to the image input section 104 using wireless communication. Further, it is also possible for the image input section 104 to be provided with an A/D converter circuit for converting an analog video signal into digital image data, and an analog video signal input terminal such as a VGA terminal. Further, it is also possible for the image input section 104 to be provided with a DisplayPort (trademark) interface, and in this case, the projector 11 can be connected to the DisplayPort provided to the PC 13 or a portable device having an equivalent function to the PC 13.

The image processing unit 110 is provided with the display control section 107 for processing the image data input via the image input section 104, and an image processing section 113 for developing the image on a frame memory 115 in accordance with the control of the display control section 107 to thereby generate the image to be projected by the projection section 30. The image processing section 113 functions as the image supply section incorporated in the projector 11.

The display control section 107 performs discrimination of the format (the frame rate, the resolution, and the compression state) of the image data input via the image input section 104, and so on to thereby determine the necessary process for displaying the display image on the light modulation device 32, and then controls the image processing section 113 to perform the process thus determined. The process performed here is, for example, frame rate conversion, interlace/progressive conversion, resolution conversion, a decompression process of the image data compressed, or format conversion of 3D image data. The image processing section 113 develops the image data input to the image input section 104 on the frame memory 115 in accordance with the control by the display control section 107, and then performs the variety of processes described above. The image processing section 113 generates the image signal with a predetermined format for displaying the image based on the image, which has been processed and drawn on the frame memory 115, and then outputs the image signal to the display control section 107. The display control section 107 outputs the image signal, which has been generated by the image processing section 113, to the light modulation device drive section 119.

Further, it is also possible for the image processing section 113 to perform various types of image processing such as a keystone correction, a color compensation corresponding to a color mode, and image expansion/contraction process in accordance with the control of the display control section 107. In other words, the control section 103 makes the display control section 107 perform the keystone correction and the expansion/contraction processes of the display image based on the operation signal input from the operation panel 41 or the remote control receiver 45. The display control section 107 calculates the various types of parameters necessary for the keystone correction or the expansion/contraction process of the display image, and then controls the image display section 113 to perform the keystone correction and the expansion/contraction process of the display image.

The pointing body 70 operated by the user is provided with the operation switch 72 described above, and a light emitting section 74 for emitting light in the case in which the operation switch 72 is in the ON state. The light emitted by the light emitting section 74 can be visible light or light (e.g., infrared light) other than the visible light.

The pointed positions by the pointing body 70 are detected by the position detection unit (the detector) 150 as described above. Further, the position detection unit 150 detects the operation state of the operation switch 72 based on the presence or absence of the light emission of the light emitting section 74.

The position detection unit 150 is provided with a position detection section 151 including an imaging section 153, a shooting control section 155, and a position detection processing section 157, and a coordinate calculation section 159 for calculating the coordinate of the pointed position 70A detected by the position detection section 151.

The imaging section 153 is a digital camera installed in the projector 11 so as to shoot a destination of the projection of the image light by the projection optical system 33. The field angle shot by the imaging section 153 is an imaging area including the displayable area 5 on the screen SC. The imaging section 153 performs the shooting in accordance with the control by the shooting control section 155, and then outputs shot image data. The shooting control section 155 controls the imaging section 153 to perform shooting in accordance with the control by the control section 103. In the case in which the imaging section 153 has a mechanism for adjusting the zoom magnification, the focus, and the aperture in the shooting operation, the shooting control section 155 controls the mechanism to perform shooting on the conditions set previously. After the shooting operation, the shooting control section 155 obtains the shot image data output by the imaging section 153, and then outputs the shot image data to the position detection processing section 157. The shot image data output from the imaging section 153 can also be the data expressed in the form such as RGB or YUV, or can also be the data representing only the luminance component. In the case in which the light emitting section 74 of the pointing body 70 emits the light (e.g., the infrared light) other than the visible light, there can also be adopted a configuration in which the imaging section 153 performs shooting through a visible light cut filter. Further, it is also possible for the shooting control section 155 to output the shot image data, which is output from the imaging section 153, to the position detection processing section 157 without conversion, or to output the shot image data to the position detection processing section 157 after performing the adjustment of the resolution or the conversion into a predetermined file format (e.g., JPEG and BMP).

The position detection processing section 157 analyzes the shot image data input from the shooting control section 155 to thereby detect the position of the tip of the pointing body 70, namely the pointed position 70A. In the present embodiment, the imaging section 153 performs shooting every predetermined time in accordance with the control by the shooting control section 155, and the position detection processing section 157 detects the pointed position 70A based on the shot image data input every predetermined time from the shooting control section 155, and then outputs the information representing the pointed position 70A detected. Further, in the case in which the position detection processing section 157 detects the operation of setting the operation switch 72 to the ON state, the position detection processing section 157 outputs the information representing the operation of setting the operation switch 72 to the ON state together with the information representing the pointed position 70A.

The position detection processing section 157 is capable of detecting not only the pen-shaped pointing body 70 but also the finger of the user as the pointing body. The position detection processing section 157 detects the image of the finger from the shot image data to thereby identify the position of the tip of the finger. In the case in which the image of a plurality of fingers is included in the shot image data, it is also possible for the position detection processing section 157 to detect all of the fingers as the pointing body, and identify the position of each of the fingers as the pointed position. In the case in which the plurality of pointing bodies 70 is used, the plurality of pointing bodies can be either of the combination of the pointing body 70 and the finger of the user and the combination of the plurality of fingers.

Further, the position detection processing section 157 is capable of determining whether or not the finger as the pointing body has contact with the screen SC based on the image of the finger included in the shot image data. For example, the position detection processing section 157 detects the image of the finger and the image of a shadow of the finger from the shot image data, and then determines whether or not the finger thus detected has contact with the screen SC based on the distance between the images thus detected. The position detection processing section 157 is capable of detecting the position of the finger, which has been detected from the shot image data, as the pointed position, or setting the position, at which the finger has contact with the screen SC, to the pointed position. For example, the position detection processing section 157 outputs the position of the tip of the finger, which has been detected from the shot image data, as the pointed position, and in the case in which the finger has contact with the screen SC, the position detection processing section 157 outputs the contact position as the pointed position, and at the same time, outputs the information representing the contact of the finger. On this occasion, the information representing the contact of the finger can be the same information as the information representing the fact that the operation switch 72 is in the ON state when operating the pointing body 70.

The coordinate calculation section 159 calculates the coordinate of the pointed position 70A detected by the position detection processing section 157. The coordinate calculated by the coordinate calculation section 159 is the coordinate in the shot image data of the pointed position 70A, and the coordinate in the coordinate axes virtually disposed on the display image of the screen SC is subsequently calculated. The coordinate in the shot image data is affected by a variety of factors such as the distance between the projector 11 and the screen SC, the zoom magnification in the projection optical system 33, the installation angle of the projector 11, and the distance between the imaging section 153 and the screen SC. The coordinate calculation section 159 calculates the coordinate of the pointed position 70A in the display image of the screen SC from the coordinate of the pointed position 70A in the shot image data based on the result of a calibration performed in advance, and then outputs the coordinate data representing the coordinate thus calculated together with the information (the operation information) representing whether the operation switch 72 is in the ON state or the OFF state (or whether or not the finger as the pointing body has contact with the screen SC) as the control data. In other words, the coordinate calculation section 159 outputs the data (the operation information) representing the fact that the operation switch 72 has been switched to the ON state in addition to the coordinate data of the pointed position 70A in the case in which the position detection processing section 157 has detected the operation (an ON operation) of setting the operation switch to the ON state, or outputs the data (the operation information) representing the fact that the operation switch 72 has been switched to the OFF state in addition to the coordinate data of the pointed position 70A in the case in which the termination of the ON operation of the operation switch 72 (an OFF operation) has been detected. It should be noted that in the calibration, a correspondence relationship (a coordinate conversion parameter) between the coordinate in the shot image data and the coordinate on the display image on the screen SC (the displayable area 5) is derived by projecting a predetermined pattern image from the projection unit 3 to the screen SC, and then shooting the pattern image thus displayed with the imaging section 153. Although a specific method of the calibration is not explained here, but may be referred to commonly-owned Japanese Patent Application No. 2011-204289.

Further, in the case in which the position detection processing section 157 detects the pointed positions of a plurality of pointing bodies and then outputs a plurality of pointed positions, the coordinate calculation section 159 can respectively calculate the coordinates of the pointed positions, and then output the coordinates to a coordinate conversion section 160.

The position detection unit 150 inputs the control data including the coordinate data output by the coordinate calculation section 159, the operation information, and so on to the control section 103. The control section 103 is provided with an operation determination section 103A (a controller) for detecting a specific operation set previously, based on the control data input from the position detection unit 150. A condition for detecting the specific operation different from the normal position pointing operation is set in advance to the operation determination section 103A. When an operation satisfying the condition thus set has been detected, the operation determination section 103A controls the output of the coordinate data and so on related to the operation on the one hand. On the other hand, the operation determination section 103A performs the function of the projector 11 set in advance in accordance with a control program 105A.

Specifically, in the case in which the operation determination section 103A detects the operation satisfying the condition thus set, the operation determination section 103A controls the coordinate conversion section 160 to stop or halt the output of the coordinate data and so on related to the operation. In the case in which this operation has been detected, the operation determination section 103A performs a function of changing the display state of the image. For example, the operation determination section 103A controls the image input section 104 to perform a function of switching the image source of the image to be displayed on the screen SC from the PC 13 to another PC 13 or another image supply section. Further, the operation determination section 103A performs, for example, a function of changing the position in the screen SC at which the image is displayed, a function of expanding/contracting the image presently displayed, a function of rotating the image presently displayed, and a function of switching between the single picture display and the multi-picture display.

Further, it is also possible for the operation determination section 103A to temporarily store the data of the pointed position input from the position detection unit 150 for a predetermined period of time to thereby generate the trajectory of the pointed position, and then determine whether or not the shape of the trajectory satisfies the condition set in advance. Further, for example, the operation determination section 103A determines the direction of the operation based on the trajectory of the pointed position thus generated, and then determines whether or not the direction coincides with a direction set in advance. On this occasion, since it is possible to set the condition so that, for example, only a complicated and specific operation satisfies the condition, it is prevented that the operation satisfying the condition described above is performed without the intention of the user.

The control data (e.g., the coordinate data) output by the coordinate calculation section 159 is input to the coordinate conversion section 160. The coordinate conversion section 160 performs the conversion of the coordinate data in accordance with the control by the control section 103, and then outputs the coordinate data and so on obtained by the conversion to the PC 13 or the image processing unit 110. In the case of outputting the coordinate data and so on to the PC 13, the coordinate conversion section 160 converts the coordinate data input from the coordinate calculation section 159 into the coordinate data representing the coordinate in the frame of the image data input by the PC 13 to the image input section 104. The conversion process is performed based on the resolution of the image data input by the PC 13 to the image input section 104 and the process performed by the image processing section 113 on the image data. Further, in the case of outputting the coordinate data and so on to the image processing unit 110, the coordinate conversion section 160 converts the coordinate data input from the coordinate calculation section 159 into the coordinate data representing the coordinate in the frame of the image generated (drawn) by the image processing section 113. In other words, the coordinate conversion section 160 is capable of the conversion into the coordinate corresponding to the PC 13 as the image supply section connected externally, and the image processing unit 110 as the image supply section incorporated in the projector 11, and performs the conversion into the coordinate corresponding to the image supply section as the destination of the coordinate data.

As the information necessary in the process of converting the coordinate performed by the coordinate conversion section 160, there can be cited information of, for example, the height and the width of the entire image generated (drawn) by the image processing section 113, the height and the width of the image (the display image) based on the image data input to the image input section 104, the position of the display image in the entire image, the resolution of the image data, and the display size in the liquid crystal display panel of the light modulation device 32. The information is output from the image processing section 113 to the coordinate conversion section 160 in response to the control of the control section 103 or the request performed by the coordinate conversion section 160.

In the case in which the coordinate conversion section 160 converts the coordinate so as to correspond to the image processing unit 110, the coordinate conversion section 160 outputs the coordinate data obtained by the conversion to the image processing section 113 together with the operation information and so on. Further, in the case in which the coordinate conversion section 160 converts the coordinate so as to correspond to the PC 13, the coordinate conversion section 160 outputs the coordinate data obtained by the conversion to the output section 101 together with the operation information and so on. In other words, the coordinate conversion section 160 outputs the coordinate data obtained by the conversion and so on to the image supply section designated by the control section 103 when performing the conversion process. Although a specific method of the coordinate conversion performed by the coordinate conversion section 160 is not explained here, but may be referred to commonly-owned Japanese Patent Application No. 2011-204289.

The output section 101 is an interface for outputting the coordinate data obtained by the conversion process performed by the coordinate conversion section 160 and so on to the PC 13, and is formed of, for example, a USB interface, a wired LAN interface, or a general purpose interface such as IEEE 1394, and a wireless communication interface can also be used. Here, it is also possible to integrate the image input section 104 and the output section 101 with each other to thereby realize both of the functions of the output section 101 and the image input section 104 with a physically single USB interface. A plurality of PC 13 is connected to the output section 101, and the output section 101 selects one or more of the PC 13 in accordance with the control by the control section 103, and then outputs the coordinate data and so on to the PC 13 thus selected. Normally, the output section 101 selects the PC 13, which is supplying the image input section 104 with the image data. In the case in which there is a plurality of PC 13 each supplying the image data, the output section 101 selects one or more of the PC 13 as the output destination in accordance with the control by the control section 103.

The coordinate data output by the output section 101 to the PC 13 is input in each of the PC 13 as the data similar to the data output by a pointing device such as a mouse, a trackball, a digitizer, or a pen tablet.

Further, it is also possible for the output section 101 to be connected to the image processing section 113 provided to the image processing unit 110, and to output the coordinate data obtained by the conversion and so on, which are output by the coordinate conversion section 160, to the image processing unit 110.

In the case in which the coordinate data and so on output from the output section 101 are treated equivalently to the data output by general-purpose pointing devices in the PC 13, a general-purpose device driver program corresponding to such general-purpose pointing devices can be used. Since such a general-purpose device driver program has normally been installed in advance as a part of the operating system (OS) of the PC 13, the PC 13 can be used without further installing the device drive program.

In the case of using the general-purpose device driver program, although there is an advantage that no dedicated device driver program is required, the information which can be exchanged between the projector 11 and the PC 13 is limited to the range determined by the specification of the general-purpose device driver program. Therefore, it is also possible to install the dedicated device driver program corresponding to the projector 11 in the PC 13, and process the coordinate data and so on output by the output section 101 using the dedicated device driver program. In this case, the information which can be exchanged between the projector 11 and the PC 13 can arbitrarily be set in accordance with the specification of the dedicated device driver program.

In the case in which the coordinate conversion section 160 outputs the coordinate data and so on to the PC 13, the PC 13 draws, for example, a line and a figure based on the coordinate data and so on input from the output section 101, then generates new image data by superimposing the line and the figure thus drawn on the image presently output to the projector 11, and then outputs the new image data to the projector 11.

Further, in the case in which the coordinate conversion section 160 outputs the coordinate data and so on to the image processing unit 110, the image processing section 113 draws, for example, a line or a figure so as to be superimposed on the image for display developed on the frame memory 115 based on the coordinate data and so on input from the coordinate conversion section 160, then generates the image signal for displaying the image thus drawn, and then outputs the image signal to the light modulation device drive section 119. It should be noted that in the case of drawing the image so as to be superimposed, it is also possible to draw the image directly to the frame memory, or to draw the image in a different layer from the layer of the image presently developed on the frame memory, and then superimpose the layers on each other.

Thus, in the display system 10, when the user performs the position pointing operation by the operation of the pointing body 70, the figure and so on are drawn and displayed so as to be superimposed on the image presently displayed on the screen SC corresponding to the position where the operation is performed.

Then, the operation of the projector 11 will be explained with reference to FIGS. 3, 4A through 4D, 5A through 5D, 6A through 6D, and 7A through 7C.

Figure 3:
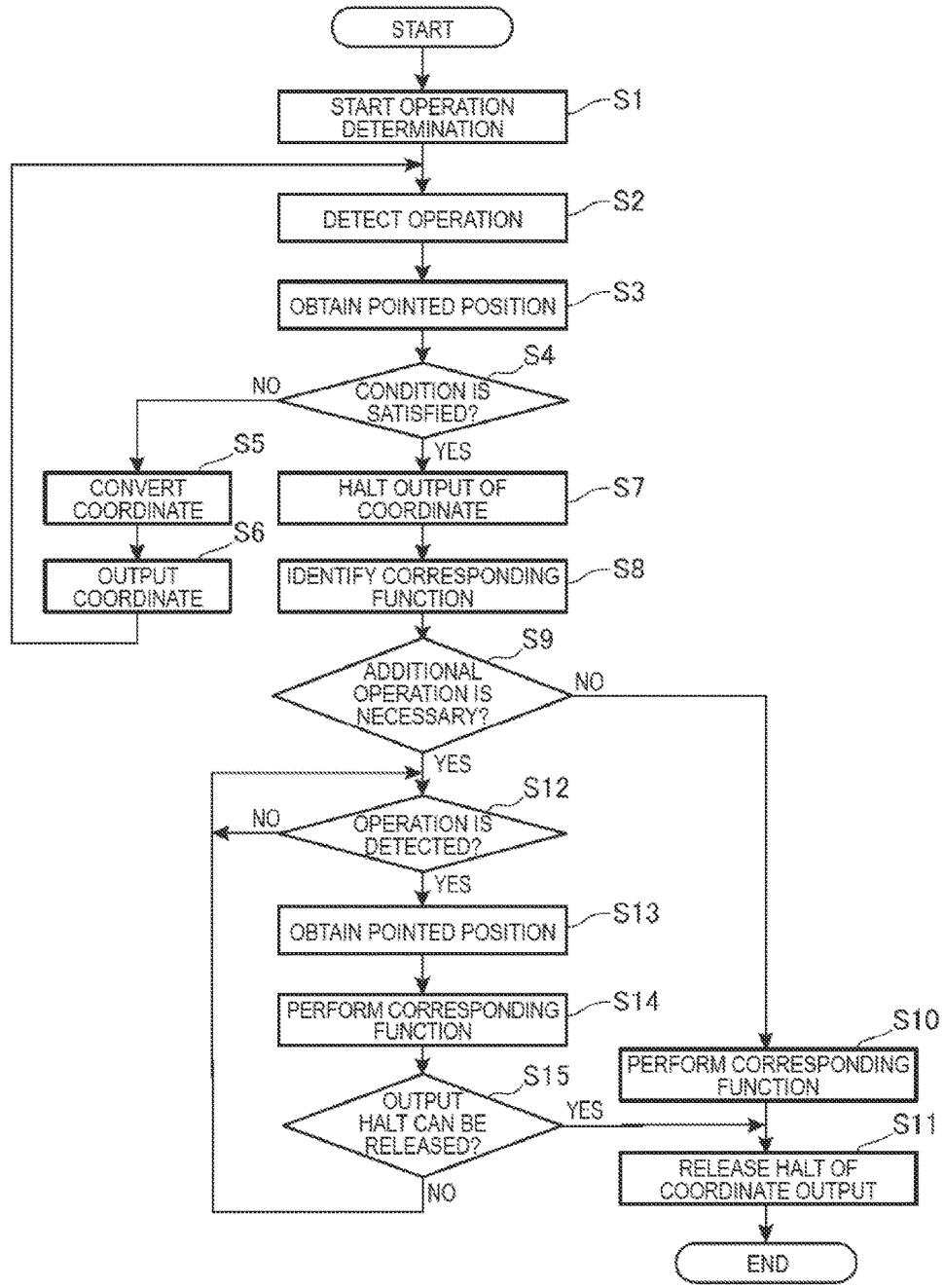
FIG. 3 is a flowchart showing an operation of a display system.

FIG. 3 is a flowchart showing the operation of the projector 11.

Due to beginning of use of the projector 11, the operation determination section 103A starts (step S1) determining whether or not the operation with the pointing body satisfies the condition set in advance. When the position detection processing section 157 detects (step S2) the operation of the pointing body, the pointed position thereof is input from the position detection unit 150 to the control section 103, and the operation determination section 103A obtains (step S3) the pointed position thus input. Here, it is sufficient that the data of the pointed position to be obtained by the operation determination section 103A is the coordinate data representing the pointed position by the pointing body. In the case of using, for example, the pointing body 70, it is also possible for the operation determination section 103A to obtain only the pointed position in the case in which the operation switch 72 is in the ON state, or to obtain all of the pointed positions including the case in which the operation switch 72 is in the OFF state.

The operation determination section 103A determines (step S4) whether or not the pointed position thus obtained or the trajectory of the pointed position formed by the pointed position thus obtained and the previous pointed positions satisfies the condition set in advance. Here, in the case in which the pointed position or the trajectory fails to satisfy the condition (NO in the step S4), the operation determination section 103A controls the coordinate conversion section 160 to perform (step S5) the conversion of the coordinate, and then controls the coordinate conversion section 160 and the output section 101 to output (step S6) the coordinate converted by the coordinate conversion section 160, and then the process returns to the step S2. On this occasion, the coordinate conversion section 160 performs the conversion of the coordinate in such a manner as described above in accordance with the control by the operation determination section 103A, and then outputs the coordinate data and so on to the output section 101 or the image processing unit 110.

In the case in which the operation is the operation (a first operation) having the pointed position or the trajectory of the pointed position satisfies the condition set in advance (YES in the step S4), the operation determination section 103A controls the coordinate conversion section 160 and the output section 101 to stop (step S7) outputting the coordinate of the pointed position with respect to the operation detected by the position detection processing section 157 in the step S2, and the subsequent operations. Subsequently, the operation determination section 103A determines (step S8) the function corresponding to the condition satisfied in the step S4. A plurality of conditions related to the pointed position or the trajectory of the pointed position can be set to the operation determination section 103A, and a corresponding function can be set to each of the conditions. The operation determination section 103A identifies the function corresponding to the condition satisfied in the step S4, and then determines (step S9) whether or not an additional operation (a second operation) is necessary to perform the function. For example, when performing the function of changing the display position of the image, an operation for designating the direction in which the display position is moved and the moving amount of the display position is required as the additional operation.

If no additional operation is necessary (NO in the step S9), the operation determination section 103A performs (step S10) the function corresponding to the condition, and then controls the coordinate conversion section 160 and the output section 101 to release the state in which the output of the coordinate is halted, and then resume (step S11) the output.

Meanwhile, if the additional operation is necessary (YES in the step S9), the operation determination section 103A waits (step S12) until the subsequent operation is detected by the position detection processing section 157. If the operation is detected (YES in the step S12), the pointed position of the operation thus detected is obtained (step S13), and then the function identified in the step S8 is performed (step S14) based on the pointed position thus obtained.

Subsequently, the operation determination section 103A determines (step S15) whether or not the restriction of the coordinate output by the coordinate conversion section 160 or the output section 101 can be released. In the case in which the function performed in the step S14 is completed, and the restoration to the function of the normal position pointing operation is possible, the operation determination section 103A proceeds to the step S11 to release the halt of the coordinate output. Further, in the case in which the restoration to the function of the normal position pointing operation should not be performed (NO in the step S15), the operation determination section 103A returns to the step S12. The condition for releasing the halt of the coordinate output is determined in advance for each of the functions performed by the operation determination section 103A. For example, in the case of performing the function of changing the display position of the image in the step S14, it is more useful that the display position can continuously be changed by the subsequent operation since the image can be moved to a desired position for the user. As the condition for releasing the halt of the coordinate output, there can be cited the number of times of the continuous execution of the steps S12 through S14, the fact that the operation detected in the step S12 is an operation satisfying a specific condition, and so on.

FIGS. 4A through 4D, 5A through 5D, 6A through 6D, and 7A through 7C are diagrams showing a specific example of the operation based on the flowchart shown in FIG. 3, and are diagrams showing an example of a function of the projector 11 controlling the display state in accordance with the position pointing operation.

Figure 4A:
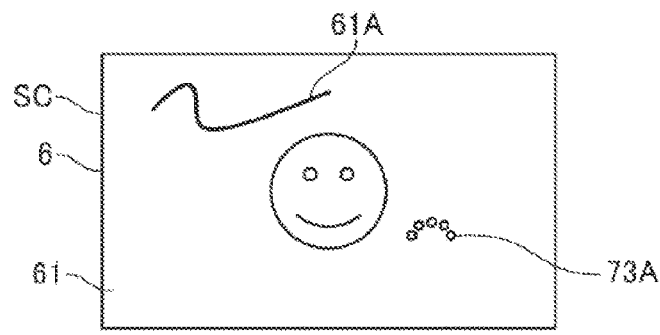
FIGS. 4A through 4D are diagrams showing an example of a function of controlling the display state in accordance with a position pointing operation.
Figure 4B:
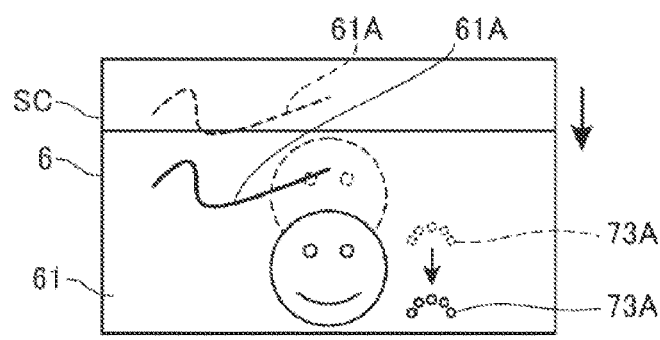
Figure 4C:
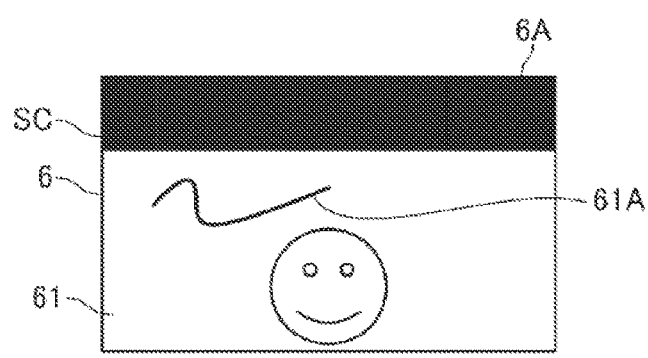
Figure 4D:
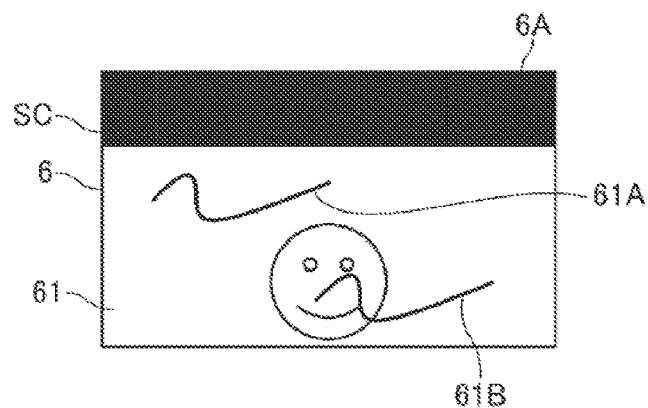

FIGS. 4A through 4D show an example related to an image moving function for changing the position of the image. FIG. 4A shows a projection state before performing the function, FIG. 4B shows an operation related to the function of changing the position, FIG. 4C shows an execution example of the function of changing the position, and FIG. 4D shows a state in which the normal position pointing operation is restored.

In this example, the operation is performed using the fingers of the user as the pointing body, and as shown in FIG. 4A, a single display area 6 is disposed in the entire displayable area 5 of the screen SC and an image 61 is projected. In this example, the operation of drawing a figure so as to be superimposed on the image 61 can be performed by the operation of the pointing body, and FIG. 4A shows the state in which a FIG. 61A is drawn along the trajectory of the pointed position.

In the example shown in FIGS. 4A through 4D, in response to the user making a plurality of fingers simultaneously have contact with the screen SC, an image moving function of translating the position of the image in the display area 6 is performed.

For example, as shown in FIG. 4A, in the case in which the user performs an operation of touching the screen with the five fingers as the first operation, and then the position detection processing section 157 detects the five pointed positions 73A, the operation determination section 103A halts the output of the coordinate data and so on to the image supply section, and at the same time performs the image moving function of translating the position of the image 61. When the image moving function is performed, the moving direction and the moving amount are designated by the user. As shown in FIG. 4B, when the user performs the operation of moving the five fingers while keeping the contact between the fingers and the screen SC as the second operation (the additional operation), the operation determination section 103A determines the moving direction and the moving amount of the display position based on the moving direction and the moving amount of the pointed positions 73A. In the example shown in FIG. 4B, the five fingers having contact with the screen SC are moved downward, and the image 61 is also moved downward by the moving amount of the pointed positions 73A. After the moving operation, as shown in FIG. 4C, a nondisplay area 6A in which nothing is displayed is formed in the upper part of the screen SC, and the lower part of the image 61 runs off the screen SC. It should be noted that since the image light modulated by the light modulation device 32 fails to reach the outside of the screen SC, namely the outside of the display area 6, the image 61 is not projected outside the screen SC.

Further, it is also possible for the user to move the five fingers having contact with the screen SC in an arbitrary direction such as an upward direction, a lateral direction, or an oblique direction, and the operation determination section 103A moves the position of the image 61 in accordance with the moving direction and the moving amount of the fingers.

As shown in FIG. 4C, after the image 61 is moved, the operation determination section 103A resumes the output of the coordinate data and so on to the image supply section, and the projector 11 is restored to the state of performing drawing in accordance with the operation of the pointing body. Therefore, when the position pointing operation is performed with the finger as the pointing body, the projector 11 draws a FIG. 61B in accordance with the operation as shown in FIG. 4D.

Figure 5A:
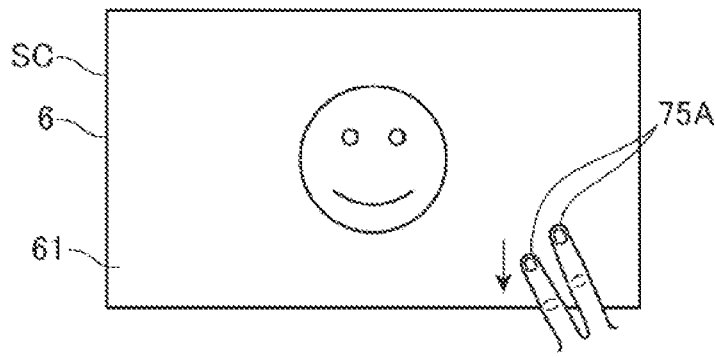
FIGS. 5A through 5D are diagrams showing an example of a function of controlling the display state in accordance with a position pointing operation.
Figure 5B:
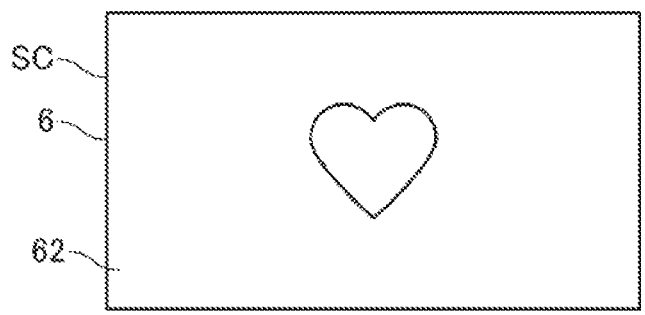
Figure 5C:
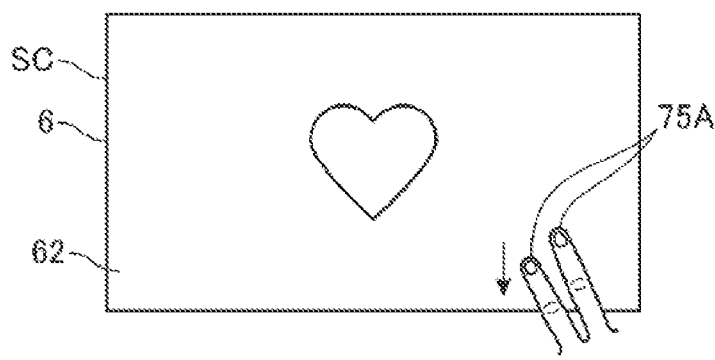
Figure 5D:
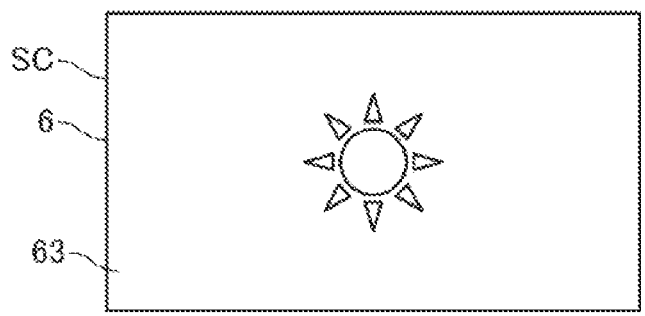

FIGS. 5A through 5D show an example of an input switching function of switching the image to be displayed. FIG. 5A shows the state before performing the function, FIG. 5B shows an execution example of the input switching function, FIG. 5C shows an example in which the input switching function is designated again, and FIG. 5D shows an execution example of the input switching function.

Also in this example, the operation is performed using the fingers of the user as the pointing body, and when the pointing body is moved in a specific direction, the projector 11 performs the input switching function. When performing the input switching function, the image data to be displayed on the screen SC is sequentially switched between the image data input from the plurality of PC 13 to the image input section 104. In other words, the PC 13 as the image supply sections connected to the projector 11 are switched sequentially. As the sequence of the switching, a forward sequence and a reverse sequence can be designated, and in the case of the forward sequence, for example, the switching is performed circularly in such an order as the PC 13A, the PC 13B, the PC 13C, . . . , the PC 13A, and in the case of the reverse sequence, the switching is performed in the reverse order to that of the forward sequence. It should be noted that it is also possible to include the image processing unit 110 incorporated in the projector 11 as the image supply section in the sequence of the switching in addition to the PC 13 externally connected to the projector 11. In the case in which the projector 11 is provided with a plurality of image supply sections for generating the image data, it is possible to set the switching sequence including the plurality of image supply sections.

As shown in FIG. 5A, in the case in which the user performs an operation of touching the screen SC with the two fingers as the first operation, and then the position detection processing section 157 detects the two pointed positions 75A, the operation determination section 103A halts the output of the coordinate data and so on to the image supply section, and at the same time controls the image input section 104 to perform an input switching function. When the input switching function is performed, the switching sequence is designated by the user. When the user performs the operation of moving the two fingers while keeping the contact between the fingers and the screen SC as the second operation (the additional operation), the operation determination section 103A determines the switching sequence based on the moving direction of the pointed positions 75A. In the case in which the pointed positions 75A move downward as in the example shown in FIG. 5A, the switching sequence is set to the forward sequence, and the display image is switched to the image based on the image data supplied by the subsequent image supply section in the forward sequence as shown in FIG. 5B. When the switching of the image is completed, the operation determination section 103A resumes the output of the coordinate data and so on to the image supply section, and then makes a transition to the state in which the normal position pointing operation is possible.

Then, when the operation of moving the two fingers downward while keeping the contact between the fingers and the screen SC is performed again as shown in FIG. 5C, the display image is switched to the image based on the image data supplied by the further subsequent image supply section in the forward sequence as shown in FIG. 5D. As described above, by repeating the operation of moving the two fingers downward, it is possible to switch the display image to a desired image. It should be noted that although not shown in the drawings, in the case of performing the operation of moving the two fingers upward while keeping the contact between the fingers and the screen SC is performed, the display image is switched to the image based on the image data supplied by the subsequent image supply section in the reverse sequence.

Figure 6A:
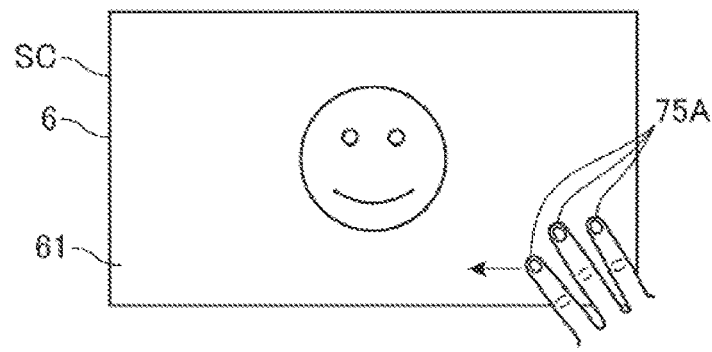
FIGS. 6A through 6D are diagrams showing an example of a function of controlling the display state in accordance with a position pointing operation.
Figure 6B:
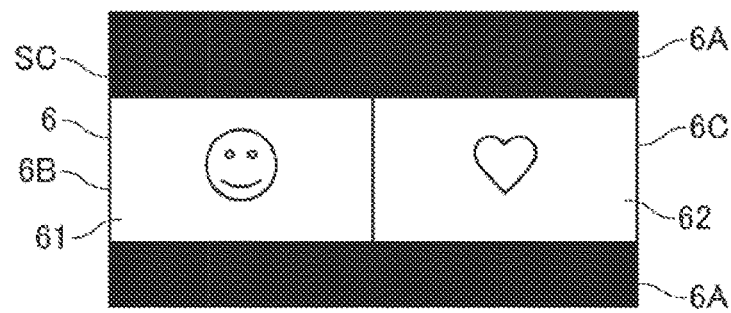
Figure 6C:
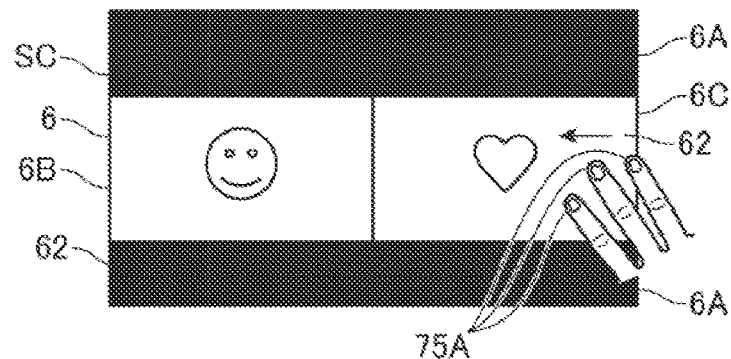
Figure 6D:
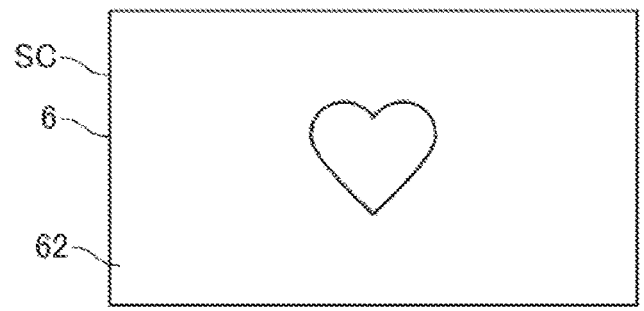

FIGS. 6A through 6D show an example of a display switching function of switching between the single picture display and the multi-picture display. FIG. 6A shows the state before performing the function, FIG. 6B shows an execution example of the above function, FIG. 6C shows an example of the operation of instructing the above function, and FIG. 6D shows an execution example of the above function.

Also in this example, the operation is performed using the fingers of the user as the pointing body, and when the pointing body is moved in a specific direction, the projector 11 switches between the single picture display and the multi-picture display. The image displayed in the single picture display and the images displayed in the multi-picture display are set in advance to either of the image data input from the plurality of PC 13.

In FIG. 6A, the single picture display is performed, and a single image 61 is disposed in the display area 6. In the case in which the user performs an operation of touching the screen SC with the three fingers as the first operation, and then the position detection processing section 157 detects the three pointed positions 75A, the operation determination section 103A halts the output of the coordinate data and so on to the image supply sections, and at the same time controls the image processing section 110 to perform the display switching function. Subsequently, when the user performs the operation of moving the three fingers leftward as indicated by the arrow in the drawing while keeping the contact between the fingers and the screen SC as the second operation (the additional operation), the operation determination section 103A makes a transition to the multi-picture display as shown in FIG. 6B. In the state shown in FIG. 6B, two display areas 6B, 6C are disposed in the display area 6, and images 61, 62 are respectively displayed in the display areas 6B, 6C. In the case of setting the aspect ratio of the display areas 6B, 6C to be equal to that of the display area 6, belt-like nondisplay areas 6A are formed on the upper part and the lower part of the display area 6 as shown in FIG. 6B. When the switching to the multi-picture display is completed, the operation determination section 103A resumes the output of the coordinate data and so on to the image supply section, and then makes a transition to the state in which the normal position pointing operation is possible.

Further, when performing the operation of moving the three fingers leftward while keeping the contact between the fingers and the screen SC is performed again as shown in FIG. 6C while executing the multi-picture display, the operation determination section 103A performs the switching to the single picture display as shown in FIG. 6D. Here, in the single picture display, the operation determination section 103A displays the image 62, which overlaps the pointed position 75A among the images 61, 62 having been displayed in the display area 6. In other words, in the case in which the leftward operation with the three fingers is detected while performing the multi-picture display, the operation determination section 103A performs the single picture display of the image overlapping the pointed position in the operation. Thus, it is possible to perform instruction of the switching to the single picture display and the designation of the image to be displayed in the single picture display with a single operation using the pointing body.

Figure 7A:
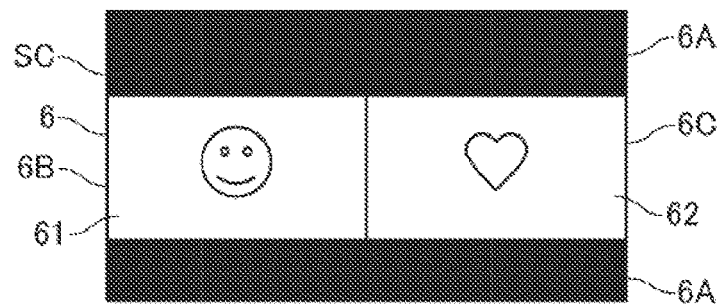
FIGS. 7A through 7C are diagrams showing an example of a function of controlling the display state in accordance with a position pointing operation.
Figure 7B:
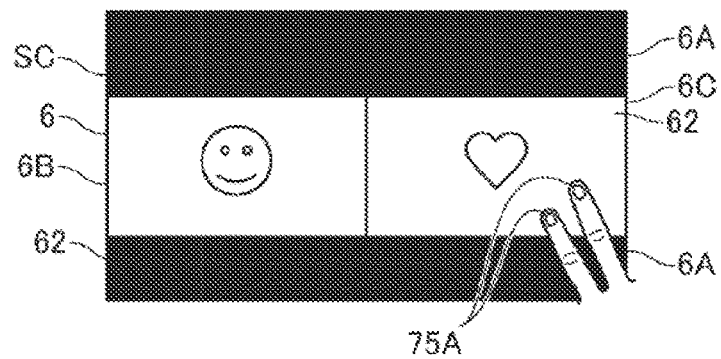
Figure 7C:
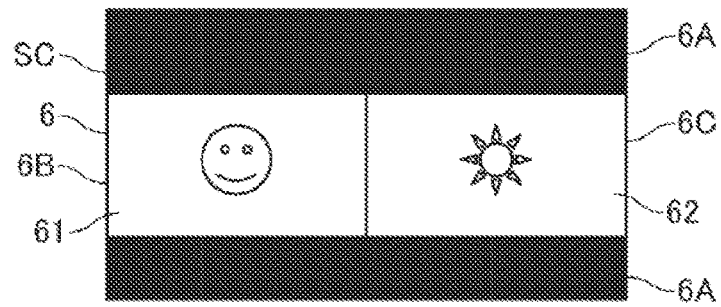

FIGS. 7A through 7C show an example of performing the input switching function while performing the multi-picture display. FIG. 7A shows the state before performing the function, FIG. 7B shows an example of the operation of instructing the switching function, and FIG. 7C shows an execution example of the switching function.

Similarly to the example shown in FIGS. 5A through 5D, in this example, the operation is performed using the fingers of the user as the pointing body, and when the pointing body is moved in a specific direction, the projector 11 performs the input switching function. The switching sequence of the image supply sections when performing the input switching function is similar to the case explained with reference to FIGS. 5A through 5D.

In the example shown in FIG. 7A, the plurality of display areas 6B, 6C are disposed in the display area 6, and the images 61, 62 are respectively displayed in the display areas 6B, 6C.

As shown in FIG. 7A, in the case in which the user performs an operation of touching the screen with the two fingers, and then the position detection processing section 157 detects the two pointed positions 75A, the operation determination section 103A controls the image input section 104 to perform the input switching function. Here, the operation determination section 103A identifies the image, which overlaps the pointed position 75A among the images 61, 62 having been displayed in the display area 6. When the user performs the operation of moving the two fingers upward or downward, the operation determination section 103A switches the image thus identified to another image 63 as shown in FIG. 7C. When the switching of the image is completed, the operation determination section 103A makes a transition to the state in which the normal position pointing operation is possible. In the example shown in FIGS. 7A to 7C, the instruction of the image switching and the designation of the image to be the target of the switching can be performed by the single operation with the pointing body.

As explained hereinabove, the projector 11 according to the present embodiment to which the invention is applied is provided with the projection unit 3 for displaying the image based on the image data supplied from the PC 13 or the image processing unit 110 as the image supply section, the position detection unit 150 for detecting the operation using the pointing body, the coordinate conversion section 160 or the output section 101 for outputting the pointed position to the image supply section in the case in which the operation is detected by the position detection unit 150, and an operation determination section 103A for restricting the output of the pointed position and performs the function of changing the display state of the image by the projection unit 3 in the case in which the operation detected by the position detection unit 150 is the operation satisfying the condition set in advance, and therefore, when the operation satisfying the condition set in advance is performed by the pointing body, the function of changing the display state is performed. Therefore, it is possible for the user to make the function of changing the display state such as the switching, expansion, or contraction of the image to be displayed on the screen SC, or the switching between the single picture display and the multi-picture display be performed without changing the pointing body gripped by hand to another device or the like, which achieves improvement in operability.

The projector 11 is arranged to perform different functions from each other in accordance with the number of fingers having contact with the screen SC in the first operation. Further, since it is arranged that the content of the function to be performed is determined in accordance with the second operation, it becomes possible to make a variety of operations be performed only by the operations using the fingers as the pointing body.

Further, in the case in which the operation detected by the position detection unit 150 is the operation satisfying the condition set in advance, the operation determination section 103A halts the output of the pointed position by the coordinate conversion section 160 with respect to the present operation and the following operations. Therefore, there is no chance for the content of the operation performed with respect to the function related to the display state to be output as the operation related to the function having previously been performed. Therefore, it is possible to efficiently switch the plurality of operations to prevent the input unintended by the user.

It should be noted that the first embodiment described above is nothing more than an example of a specific aspect to which the invention is applied, and therefore, does not limit the invention. Therefore, it is also possible to apply the invention as an aspect different from the first embodiment described above. For example, although in the first embodiment (FIGS. 4A through 4D, 5A through 5D, 6A through 6D, and 7A through 7C) described above, the example of changing the display state using the fingers of the user as the pointing body is shown, it is also possible to adopt an aspect of changing the display state using the pen-shaped pointing body 70. Further, the pointing body is not limited to the fingers and the pen-shaped pointing body 70, it is also possible to use an operation device having a rod-like shape or a pointer such as a laser pointer as the pointing body. Further, it is also possible to adopt a configuration, which is provided with a plurality of pointing bodies 70 assigned with respective functions different from each other, and is capable of operating the functions different from each other using the pointing bodies 70 even by the similar operations to the same operation area. Further, it is also possible to adopt a configuration capable of operating different functions even by the similar operations to the same operation area using the combinations of the pointing bodies 70 having the respective types different from each other.

Further, it is also possible to arrange that the position detection processing section 157 is capable of simultaneously detecting a plurality of operations with the respective pointing bodies. On this occasion, in the case in which the operation of either of the plurality of pointing bodies among the operations of the plurality of pointing bodies detected by the position detection processing section 157 satisfies the condition set in advance, it is also possible for the operation determination section 103A to identify the pointing body having used for performing the operation, restricts the output of the pointed position by the coordinate conversion section 160, the output section 101, or the coordinate conversion section 160 and the output section 101 with respect to the operation of the pointing body thus identified, and then perform the function related to the display state of the image by the projection unit 3. According to this configuration, in the case in which the operation is performed with the plurality of pointing bodies, it becomes possible to detect the operation satisfying the condition set in advance for each of the pointing bodies to perform the control related to the display state. Thus, it is possible to achieve improvement in operability in the case of performing the operation using the plurality of pointing bodies.

In the first embodiment described above, although the light emitting section 74 of the pointing body 70 has the configuration of lighting when the operation switch 72 is in the ON state, it is also possible to adopt a configuration in which a pattern of blinking (lighting/non-lighting) of the light emitting section 74 varies in accordance with the operation state (ON/OFF) of the operation switch 72. According to this configuration, since the position detection unit 150 can always detect the pointed position of the pointing body 70 irrespectively of the operation state (ON/OFF) of the operation switch 72, it becomes possible for the user to move the pointer on the screen only by moving the pointing body 70 similarly to other pointing devices. Further, a similar advantage can also be obtained by adopting a configuration provided with a transmission section for transmitting the operation state of the operation switch 72 via radio wave together with the light emitting section 74 always emitting the light.

The correspondence between the operation content by the user and the function to be performed in accordance with the operation content is not limited to the configuration described in the first embodiment section (FIGS. 4A through 4D, 5A through 5D, 6A through 6D, and 7A through 7C), but it is also possible to arrange that the function different from that of the first embodiment described above is assigned to each of the combinations of the number of fingers in the first operation and the moving direction of the fingers in the second operation. Further, it is also possible to arrange that the functions are designated by combinations of a larger number of operations such as a third operation and a fourth operation.

Although in the first embodiment, it is arranged that the operation determination section 103A performs the function of changing the display state of the image in the case of performing the second operation (e.g., movement of the fingers) after the first operation (e.g., the contact with a plurality of fingers), it is also possible to arrange that the function is performed in response only to the first operation. For example, in the display switching function shown in FIGS. 6A through 6D, it is also possible to arrange that the operation determination section 103A performs the switching between the single picture display and the multi-picture display in response only to touching the screen SC with the three fingers, or in response only to keeping the contact state for a predetermined time.

Although in the first embodiment described above, it is arranged that the function of changing the display state of the projector 11 is performed in the case in which the user performs the first operation, the function to be performed is not limited to the function of changing the display state, but it is also possible to arrange to perform other functions.

In the first embodiment described above, it is also possible to arrange that the output destination of the coordinate data and so on is switched in the case in which the user performs the first operation. For example, it is possible to arrange that the output destination of the coordinate data and so on is switched to the image supply section located inside the projector 11 in the case in which the first operation (e.g., an operation of touching the screen SC with a plurality of fingers) is performed in a state of outputting the coordinate data and so on to the external image supply section. Further, in the case in which a plurality of image supply sections is externally connected to the projector 11, or in the case in which a plurality of image supply sections is provided inside the projector 11, it is also possible to arrange that the output destination is sequentially switched every time the first operation is performed, or it is also possible to arrange that the output destination can be designated in accordance with the operation content (e.g., the number of fingers to have contact).

In the first embodiment, although the contact to the screen SC with a plurality of fingers is set to the first operation, the first operation is not limited to this configuration. For example, it is also possible to set the operation of making the palm have contact with the screen SC to the first operation, or it is also possible to set the operation of moving the pointed position along a predetermined locus, namely the operation of drawing a predetermined shape (e.g., a mark) with the pointing body, to the first operation.

When detecting the contact of the plurality of fingers with the screen SC as in the first embodiment described above, it is also possible to determine the contact of the plurality of fingers in the case in which the distance between the plurality of pointed positions detected is within a predetermined distance in order to identify the fact that the operation is performed by a single user.

In the case in which a new operation with the pointing body is detected by the position detection unit 150 while the operation determination section 103A is performing the corresponding function in the step S14 (see FIG. 3), it is also possible for the operation determination section 103A to ignore the operation, or to halt the function presently performed.

Although in the first embodiment described above (FIGS. 4A through 4D, 5A through 5D, 6A through 6D, and 7A through 7C), the configuration in which the user performs the operation in one hand is described, more intuitive operation becomes possible by adopting a configuration in which the user performs the operation using the both hands. For example, it is also possible to arrange that in the case in which a predetermined time has elapsed since the position detection unit 150 has detected the contact by the fingers (one finger or more than one fingers) of one hand, or in the case in which the position detection unit 150 detects the contact by the fingers (a plurality of fingers) of the one hand as the first operation, the operation determination section 103A halts the output of the coordinate to the image supply section, and then, in the case in which the user moves the fingers (one finger or more than one fingers) of the other hand while keeping the contact with the screen SC as the second operation while performing the first operation, and the position detection unit 150 detects this operation, the image moving function is performed. Further, it is also possible to contract or expand the image in the case of moving the contact position of the finger of the other hand closer to or away from the position (the position at which the finger has contact) at which the first operation is performed. Further, it is also possible to arrange to rotate the image in the case of drawing a circular arc with the finger of the other hand centered on the position at which the first operation is performed. Further, it is also possible to arrange to perform the input switching function and the display switching function in the case of moving the finger of the other hand in a predetermined direction while performing the first operation with the one hand. Further, it is also possible to arrange that the number of the pictures (the display areas) in the multi-picture display can be set in accordance with the number of the fingers of the other hand having contact with the screen SC while performing the first operation with the one hand. For example, it is possible to arrange that the multi-picture display having four pictures is performed in the case of the four fingers of the other hand have contact with the screen SC while performing the first operation with the one hand. Further, it is also possible to arrange that different functions can be performed in accordance with the combination between the number of fingers having contact in the first operation and the number of fingers having contact in the second operation.

In the first embodiment described above, it is also possible to arrange to output the information for canceling the first operation after receiving the first operation so as to prevent the operation corresponding to the first operation from being performed on the image supply section during the period in which the operation determination section 103A halts the output of the coordinate data and so on to the image supply section in response to the first operation, and performs the function of changing the display state of the projector 11. According to this process, it becomes possible to suppress the phenomenon that an unexpected action occurs in the image supply section when the output of the coordinate data and so on to the image supply section is resumed.

Second Embodiment

A second embodiment to which the invention is applied will hereinafter be explained with reference to the accompanying drawings.

The display system 10 functions as an interactive white board system, which receives the position pointing operation performed by the user using the pointing body 70, and then reflects the operation on the projection image. The display system 10 performs, for example, a function of drawing a figure and so on based on the pointed position 70A. The function of performing the drawing and so on can be performed by the projector 11, or can be performed by the PC 13. Here, an operation mode in which the projector 11 performs the function of performing the drawing and so on is referred to as a PJ mode, and an operation mode in which the PC 13 performs this function is referred to as a PC mode. The PJ mode and the PC mode are exclusively switched.

In the PC mode, when the projector 11 detects the pointed position 70A of the pointing body 70, the data representing the coordinate of the pointed position 70A is output to the PC 13. The PC 13 having received the data draws the figure and so on based on the coordinate of the pointed position 70A, and then generates the image data for display based on the image including the figure and so on alone or superimposed on another image. The PC 13 outputs the image data for display thus generated to the projector 11. Since the projector 11 projects the image based on the image data input from the PC 13 on the screen SC, the image including the figure and so on drawn based on the coordinate of the pointed position of the pointing body 70 is projected on the screen SC.

On the other hand, in the PJ mode, the projector 11 processes the data representing the coordinate of the pointed position 70A thus detected using the image supply section incorporated therein. Further, the projector 11 performs the process such as the drawing of the figure based on the pointed position 70A to generate the image, and then projects the image thus generated on the screen SC by superimposing the image on an image presently projected.

Figure 8:
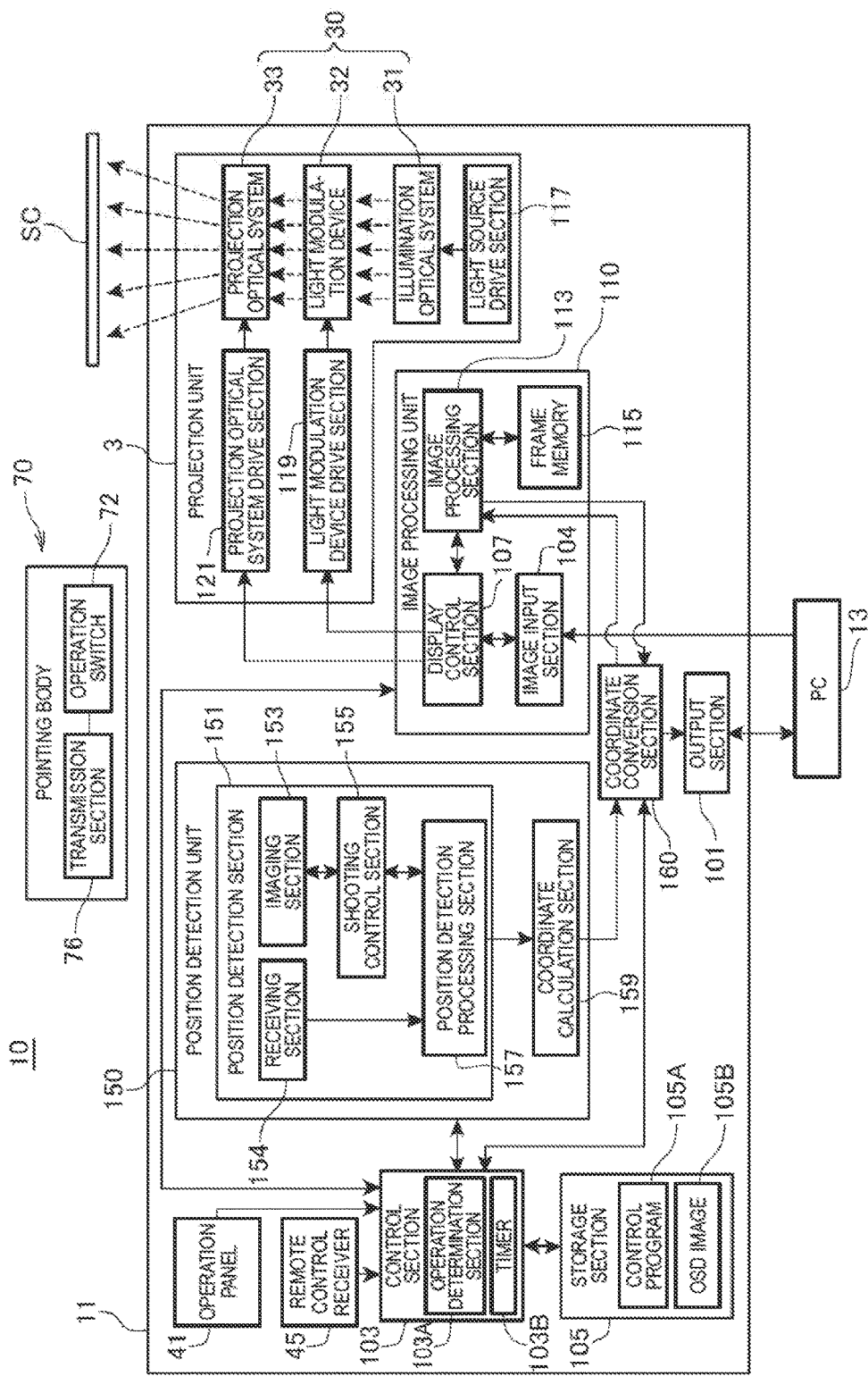
FIG. 8 is a block diagram showing a functional configuration of a display system according to a second embodiment of the invention.

FIG. 8 is a block diagram showing a functional configuration of the display system 10 according to the present embodiment. It should be noted that the constituents performing similar action to those of the first embodiment (FIG. 2) will be omitted from the explanation.

The pointing body 70 according to the present embodiment is provided with the operation switch 72, and a transmission section 76 for outputting a signal representing the operation state (ON/OFF) of the operation switch 72. The transmission section 76 transmits, for example, an infrared signal representing the ON/OFF state of the operation switch 72 using the method compliant with the IrDA standard. The pointed positions by the pointing body 70 are detected by the position detection unit (the detector) 150 as described above. It should be noted that it is possible for the position detection unit 150 to have a configuration of detecting one type of pointing body 70, or a configuration capable of detecting a plurality of types of pointing body 70, for example, both of a pen-shaped operation device and the fingers of the user. In the case in which the position detection unit 150 is capable of detecting a plurality of types of pointing body 70, the position detection unit 150 can have a configuration capable of detecting the type of the pointing body 70.

Further, the position detection unit 150 detects the operation state of the operation switch 72 based on the signal transmitted by the transmission section 76. Further, it is also possible for the position detection unit 150 to have a configuration of detecting whether or not the tip of the pointing body 70 has contact with the screen SC to thereby detect the position pointing operation using the pointing body 70.

As the method of the detection of the pointing body 70 by the position detection unit 150, a variety of methods can be adopted. For example, it is also possible to adopt the configuration in which the pointing body 70 has a light emitting section not shown, and the light emitting section emits light when the tip of the pointing body 70 has contact with the screen SC as in the first embodiment. Further, it is also possible for the position detection unit 150 to have a configuration of analyzing the light emission position of the light emitting section of the pointing body 70 on a shot image data of the imaging section 153 described later, and calculating the coordinate of the pointed position 70A by the pointing body 70. According to this configuration, it becomes possible to detect the pointed position 70A by the pointing body 70, and presence or absence of the contact between the pointing body 70 and the screen SC. It should be noted that the light emitted by the light emitting section of the pointing body 70 can be visible light, or invisible light such as infrared light. In the case in which the light emitting section of the pointing body 70 emits the invisible light, it is also possible to adopt a configuration of disposing a visible light cut filter for transmitting only the infrared light in an anterior stage of the imaging section 153.

Further, it is also possible for the pointing body 70 to have a configuration of changing the blinking (lighting/non-lighting) pattern between the period in which the tip has contact with the screen SC and the period in which the tip does not have contact with the screen SC besides the configuration in which the light emitting section emits light when the tip has contact with the screen SC. According to this configuration, it becomes possible to detect the pointed position 70A by the pointing body 70, and presence or absence of the contact between the pointing body 70 and the screen SC. Further, according to this configuration, it becomes also possible to detect a hovering state of the pointing body 70, in which the pointing body 70 moves above the screen SC in a state having the tip of the pointing body 70 contactless with the screen SC.

The position detection unit 150 is provided with the position detection section 151 including the imaging section 153, the shooting control section 155, a receiving section 154, and the position detection processing section 157, and the coordinate calculation section 159 for calculating the coordinate of the pointed position 70A detected by the position detection section 151.

The receiving section 154 receives a wireless signal transmitted by the transmission section 76 of the pointing body 70 to detect the operation state of the operation switch 72, and then outputs data representing the detection result to the position detection processing section 157. The position detection processing section 157 detects the pointed position 70A of the pointing body 70 based on the shot image data of the imaging section 153, and obtains the operation state of the operation switch 72 based on the data input from the receiving section 154.

It should be noted that in the case of adopting the configuration in which the imaging section 153 receives the infrared light to perform shooting, and the transmission section 76 transmits the infrared signal as in the first embodiment, the receiving section 154 can be eliminated by the position detection processing section 157 detecting the infrared signal, which has been transmitted by the transmission section 76, from the shot image data.

The control section 103 is provided with the operation determination section 103A for determining whether or not the operation with the pointing body 70 is an operation having a predetermined configuration set in advance based on the data input from the position detection unit 150, and a timer 103B for performing timing under the control of the operation determination section 103A. The operation determination section 103A and the timer 103B are realized in a software manner by the CPU executing the control program 105A.

The operation determination section 103A is configured to detect the operation having the predetermined configuration as a different operation from the normal position pointing operation. The condition for detecting the operation having the predetermined configuration is set to the operation determination section 103A, and the operation determination section 103A determines that the operation is the operation having the predetermined configuration in the case in which the data representing the coordinate of the pointed position 70A input from the position detection processing section 157 and the operation state of the operation switch 72 satisfies the condition described above. In the case in which the position detection processing section 157 detects the pointed position 70A at every predetermined time, and outputs the coordinate of the pointed position 70A every time the position detection processing section 157 performs the detections, the operation determination section 103A can detect the operation having the predetermined configuration based on the pointed positions 70A corresponding respectively to the plurality of turns output by the position detection processing section 157. In the present embodiment, it is assumed, as an example, that the operation having the predetermined configuration denotes an operation in which the ON state of the operation switch 72 lasts for a predetermined time with the pointed position 70A fixed. Here, the range (setting range) in which the pointed position 70A is regarded as a fixed position is also set in advance. In other words, in addition to the case in which the coordinate of the pointed position 70A is constant, the case in which the coordinate of the pointed position 70A is kept within the range set in advance from the coordinate of the pointed position 70A located when the operation switch 72 has been set to the ON state is also regarded as the case in which the condition that "the pointed position 70A is fixed" is satisfied. The range in which the pointed position 70A is regarded as a fixed position can be set larger than the unit by which the position detection processing section 157 detects the pointed position 70A. The time and the range of the coordinate related to the condition for determining the operation having the predetermined configuration are stored in the storage section 105.

When the data representing the ON operation of the operation switch 72 is input from the position detection processing section 157, the operation determination section 103A starts timing with the timer 103B, and obtains the coordinate of the pointed position 70A input together with the data. Subsequently, based on the data input from the position detection processing section 157 at every predetermined time, the operation determination section 103A continues the timing with the timer 103B during the period in which the coordinate of the pointed position 70A is kept within the range set in advance and the ON state of the operation switch 72 lasts. Then, in the case in which the count value of the timer 103B reaches the preset time, the operation determination section 103A determines that the operation having the predetermined configuration has been done. Based on the data output from the position detection processing section 157, the operation determination section 103A halts the timing with the timer 103B in the case in which the operation switch 72 is switched to the OFF state or the pointed position 70A moves out of the preset range before the preset time is reached. On this occasion, the control section 103 performs the process corresponding to the normal position pointing operation based on the pointed position 70A.

In the case in which the operation determination section 103A determines that the operation has the predetermined configuration, the operation determination section 103A controls the coordinate conversion section 160 and the output section 101 to stop or suspend the output of the coordinate data related to the operation. Further, the operation determination section 103A performs the function of the projector 11 set in advance in accordance with the control program 105A. Specifically, the operation determination section 103A controls the image processing unit 110 to display the image based on OSD image data 105B stored in the storage section 105 on the screen SC.

While the projector 11 operates in the PJ mode, the coordinate conversion section 160 converts the coordinate so as to correspond to the image processing unit 110, and then outputs the coordinate data obtained by the conversion to the image processing section 113. Further, while the projector 11 operates in the PC mode, the coordinate conversion section 160 converts the coordinate so as to correspond to the PC 13, and then outputs the coordinate data obtained by the conversion to the output section 101.

In the case in which the projector 11 operates in the PC mode, the PC 13 draws, for example, a line and a figure based on the coordinate data input from the output section 101, then generates new image data by superimposing the line and the figure thus drawn on the image presently output to the projector 11, and then outputs the new image data to the projector 11.

Further, in the case in which the projector 11 operates in the PJ mode, the image processing section 113 draws, for example, a line and a figure so as to be superimposed on the image for display developed on the frame memory 115 based on the coordinate data input from the coordinate conversion section 160 or the output section 101, then generates the image signal for displaying the image thus drawn, and then outputs the image signal to the light modulation device drive section 119.

Thus, in the display system 10, when the user performs the position pointing operation by the operation of the pointing body 70, the figure and so on are drawn and displayed so as to be superimposed on the image presently displayed on the screen SC corresponding to the position where the operation is performed.

The control section 103 switches the mode between the PC mode and the PJ mode in accordance with the operation of the operation panel 41. In the PC mode, the control section 103 controls the coordinate conversion section 160 to convert the coordinate, which has been calculated by the coordinate calculation section 159, into the coordinate corresponding to the PC 13 to which the image data is inputting, and then output the coordinate obtained by the conversion to the output section 101. In the PJ mode, the control section 103 controls the coordinate conversion section 160 to output the coordinate calculated by the coordinate calculation section 159 to the image processing unit 110. Further, the control section 103 controls the image processing unit 110 to perform the process such as drawing based on the coordinate of the pointed position 70A output by the coordinate conversion section 160.

Figure 9:
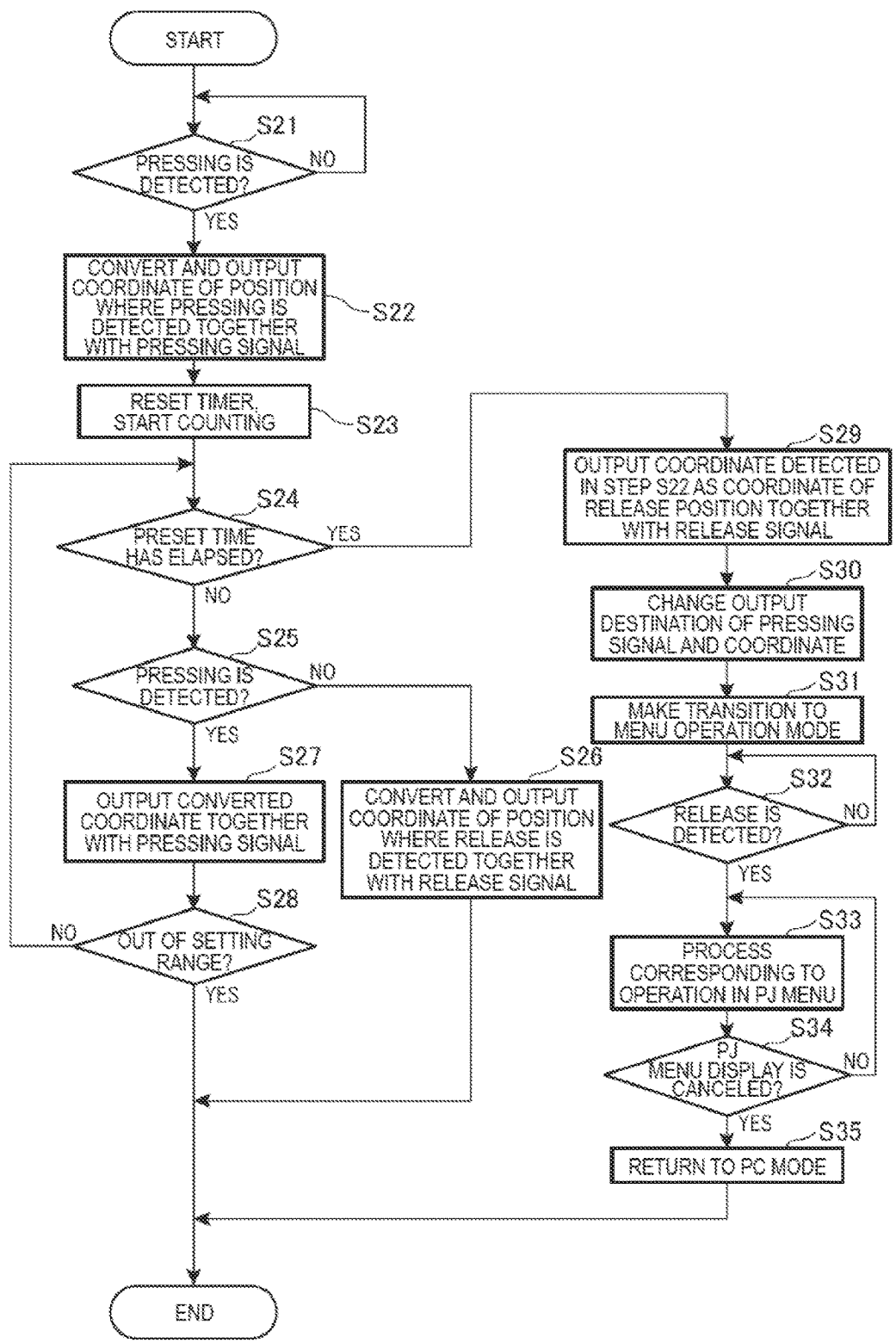
FIG. 9 is a flowchart showing an operation of a projector according to the second embodiment.

FIG. 9 is a flowchart showing the operation of the projector 11. FIG. 9 shows an operation of the projector 11 in the case of detecting the operation of the pointing body 70 while operating in the PC mode.

The control section 103 displays the image based on the image data input from the PC 13, and then waits for (step S21) the pressing operation by the pointing body 70. If the position detection unit 150 detects the pressing operation of the pointing body 70, namely the operation of setting the operation switch 72 to the ON state is detected (YES in the step S21), the data representing the ON operation of the operation switch 72 and the data representing the coordinate of the pointed position 70A are input from the position detection processing section 157 to the control section 103.

The operation determination section 103A obtains the coordinate of the pointed position 70A input from the position detection processing section 157, and controls the coordinate conversion section 160 to convert the coordinate of the pointed position 70A at the time point when the pressing operation is detected, and output (step S22) the coordinate thus converted to the PC 13 together with a pressing signal. The pressing signal is data representing the fact that the operation switch 72 is set to the ON state. Subsequently, the operation determination section 103A monitors data input from the position detection processing section 157 at every predetermined time, and if the data of the coordinate of the pointed position 70A is input, the operation determination section 103A obtains the coordinate.

The operation determination section 103A resets the timer 103B, and then starts (step S23) the count.

The operation determination section 103A determines (step S24) whether or not the count value of the timer 103B reaches the preset time set in advance. If the count value of the timer 103B has not yet reached the preset time (NO in the step S24), the operation determination section 103A determines (step S25) whether or not the pressing operation is detected, namely the pressing operation continues.

If the pressing operation fails to continue, namely a release operation of the pointing body 70 has been performed (NO in the step S25), the operation determination section 103A performs the control in the step S26. In the step S26, the operation determination section 103A controls the coordinate conversion section 160 to convert the coordinate of the pointed position 70A at the time point when the release operation is detected, and then output the coordinate obtained by the conversion to the PC 13 together with a release signal, and then waits for the termination of the PC mode. It should be noted that the release signal is data representing the fact that the operation switch 72 is set to the OFF state.

If the pressing operation of the pointing body 70 continues (YES in the step S25), the operation determination section 103A performs the control in the step S27. In the step S27, the operation determination section 103A controls the coordinate conversion section 160 every time the pointed position 70A is obtained to convert the coordinate of the pointed position 70A, and then output the coordinate data obtained by the conversion to the PC 13 together with the pressing signal.

Subsequently, the operation determination section 103A determines (step S28) whether or not the coordinate of the pointed position 70A moves outside the setting range.

If the operation determination section 103A determines that the coordinate of the pointed position 70A is not out of the setting range (NO in the step S28), the operation determination section 103A returns the control to the step S24.

If the operation determination section 103A determines that the coordinate of the pointed position 70A is out of the setting range (YES in the step S28), the operation determination section 103A waits for the termination of the PC mode. Meanwhile, the operation determination section 103A continues the process of controlling the coordinate conversion section 160 every time the pointed position 70A is obtained to convert the coordinate of the pointed position 70A, and then outputting the coordinate data obtained by the conversion to the PC 13 together with the pressing signal.

On the other hand, if the count value of the timer 103B has reached the preset time (YES in the step S24), the operation determination section 103A outputs (step S29) the coordinate detected in the step S22 to the PC 13 as the coordinate of the release position together with the release signal. The operation determination section 103A changes (step S30) the output destination of the pressing signal and the coordinate from the PC 13 to the image processing unit 110. Thus, the output of the data such as the coordinate to the PC 13 stops.

Further, the operation determination section 103A controls the image processing unit 110 to display a menu image (a PJ menu image) at an arbitrary position of the screen SC based on the OSD image data 105B stored in the storage section 105, and then makes (step S31) a transition to a menu operation mode.

Subsequently, the operation determination section 103A determines (step S32) whether or not the release operation of the pointing body 70 has been detected. If the release operation has not yet been detected (NO in the step S32), the operation determination section 103A continues to wait for the detection of the release operation. If the release operation is detected (YES in the step S32), the operation determination section 103A performs (step S33) the process corresponding to the operation on the menu image. In other words, the position pointing operation is performed on the menu image displayed on the screen SC using the pointing body 70, and then the operation determination section 103A performs the function corresponding to the icon included in the menu image. During the period from the transition to the menu operation mode to the completion of the release operation of the pointing body 70, the pressing operation of the pointing body 70 is not detected, and is thus invalidated. Therefore, since the process corresponding to the operation on the menu image is not performed after the transition to the menu operation mode until the release operation of the pointing body 70 is once performed, the following advantage can be obtained. Even if the pointed position 70A of the pointing body 70 is located at the position overlapping an icon of a function, which is not intended to be performed, at the time point when the menu image is displayed, the function corresponding to the icon on which the pointing operation is performed with the pointing body 70 is prevented from being performed. Thus, it is prevented that an unintended icon is selected at the same time as the display of the menu image and an unexpected function is performed. It should be noted that by arranging that the operation determination section 103A performs the control of displaying a menu image 200 at the position not overlapping the pointed position 70A by the pointing body 70, there is no chance that any of the icons of the menu image 200 is selected by the pointing body 70 at the same time as the display of the menu image 200. Thus, it is also possible to eliminate the control in the step S32.

Subsequently, the operation determination section 103A determines (step S34) whether or not an operation for canceling the menu operation mode has been performed, namely whether or not the display of the menu image has been canceled. The operation determination section 103A continues the operation of the step S33 until the operation for canceling the menu operation mode is performed, then returns (step S35) to the PC mode if the operation for canceling the menu operation mode is performed (YES in the step S34). When returning to the PC mode, the operation determination section 103A changes the output destination of the data representing the coordinate of the pointed position 70A and the operation state of the operation switch 72 to the PC 13.

The operation shown in FIG. 9 can similarly be performed also in the case in which the projector 11 operates in the PJ mode. During the operation in the PJ mode, the operation determination section 103A makes the coordinate conversion section 160 perform the conversion into the coordinate to be output to the image processing unit 110 in the steps S27, S30. Further, in the case of the PJ mode, the operation determination section 103A sets the output destination, to which the data such as the coordinate is output, to the image processing unit 110 in the steps S28, S29, and S31, and then returns from the menu operation mode to the PJ mode in the step S38. Except these differences, the operation determination section 103A can make a transition to the menu operation mode in accordance with the operation having a predetermined configuration of the pointing body 70 also in the PJ mode.

Figure 10:
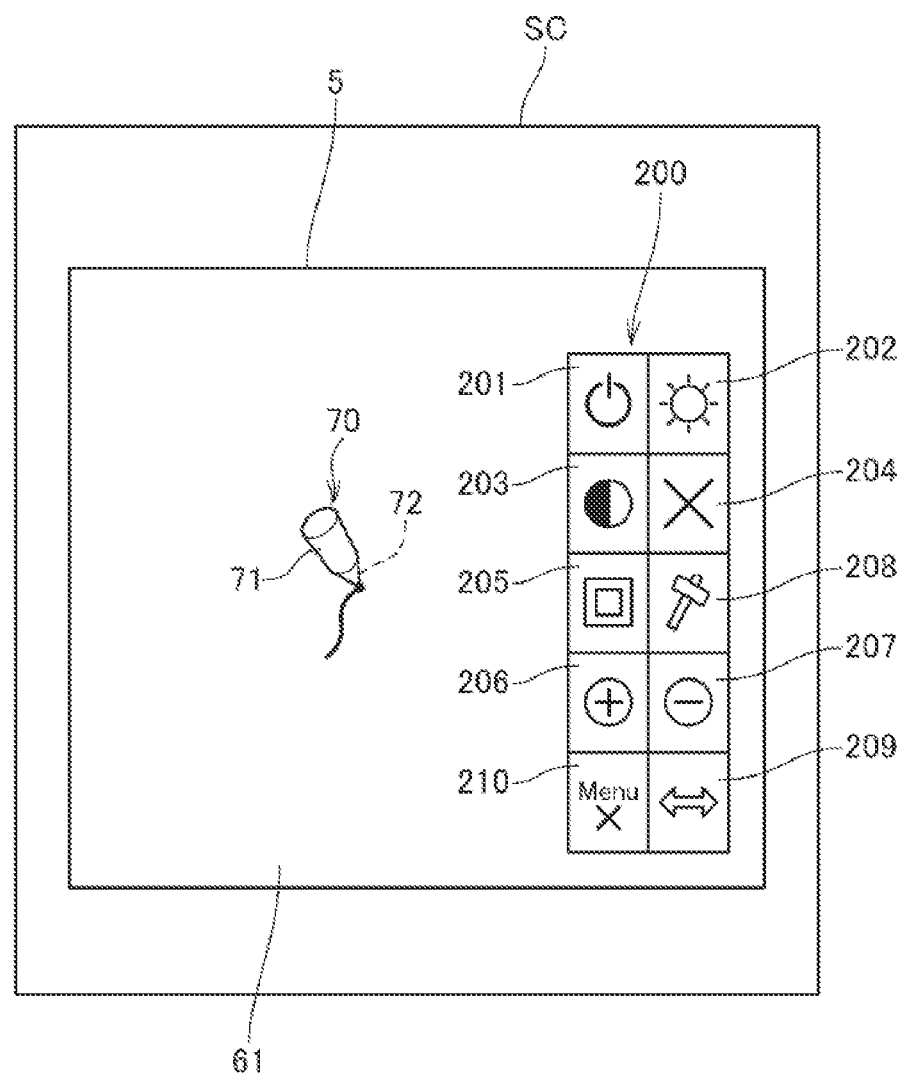
FIG. 10 is a diagram showing an example of projecting an image on a screen in the second embodiment.

FIG. 10 is a diagram showing an example of displaying an image on the screen SC, and in particular shows a display example when making a transition to the menu operation mode.

In the displayable area 5 on the screen SC, there is projected an image 61 by the projector 11. In the menu operation mode, the menu image 200 is projected so as to overlap the image 61. The menu image 200 is an image obtained by overlapping the OSD image data 105B (FIG. 2) and the image 61 using the image processing unit 110. A plurality of (10 in the example shown in FIG. 10) icons 201 through 210 is arranged in the menu image 200, and specific functions are assigned to the respective icons. When the position overlapping any of the icons 201 through 210 is pointed by the pointing body 70, and the operation switch 72 is set to the ON state, the control section 103 performs the function assigned to the icon overlapping the pointed position 70A. For example, the icon 201 corresponds to a function of turning OFF the power of the projector 11, the icon 202 corresponds to a light control function of the projection image, and the icon 203 corresponds to a contrast control function of the projection image. The icon 204 corresponds to an AV mute function for stopping the projection, the icon 205 corresponds to a resolution control function of the projection image, the icon 206 corresponds to a function of expanding the projection image, and the icon 207 corresponds to a function of contracting the projection image.

The icon 208 is an icon for instructing the transition to a configuration mode related to the variety of functions of the projector 11, the icon 209 is an icon for instructing the transition from the PC mode to the PJ mode and the transition from the PJ mode to the PC mode, and the icon 210 is an icon for instructing the cancel of the menu operation mode.

In this example, by operating the icons 201 through 207, it is possible to variously change the display state of the image presently projected on the screen SC. Such functions of changing the display state of the image are the functions related to the control of a main unit of the projector 11, and have therefore generally been performed along a menu hierarchy of an image configuration mode after making a transition to the image configuration mode using the remote controller or the operation panel 41 in the past. In the example described above, since the display state of the image can directly be changed only by pointing the icon in the menu image 200 with the pointing body 70, improvement in operability can be achieved.

Further, by pointing the icon 209 with the pointing body 70, it is possible to change the output destination, to which the coordinate of the pointed position 70A is output, between the PC 13 and the image processing unit 110 from each other. In the past, the operation of this kind has generally been performed using the operation panel 41, and it has been necessary for the user to come closer to the main unit of the projector 11. However, in the example described above, the output destination of the coordinate can be changed by a single operation using the pointing body 70.

Further, in the case in which the icon 210 is pointed by the pointing body 70, as explained in the step S35 shown in FIG. 9, it is possible to promptly terminate the menu operation mode using the menu image 200, and return to the normal position pointing operation for performing drawing and so on.

It should be noted that the projector 11 is capable of displaying the menu image 200, to which the function of, for example, designating the attribution of the figure to be drawn is assigned, in the PC mode or the PJ mode before making a transition to the menu operation mode. In this case, when making a transition to the menu operation mode, the operation determination section 103A stops the display of the menu image 200 presently displayed, and then displays the menu image 200. Thus, since the menu image 200 is not displayed on the screen SC in a superimposed manner, it is possible for the user to more intuitively operate the menu image 200.

In the example described above, there is explained the configuration in which the control section 103 makes a transition to the menu operation mode in the case in which the pressing operation of the pointing body 70 lasts in the setting range for a preset time to thereby make it possible to control the functions of the projector 11 in accordance with the operation of the icons 201 through 210 in the menu image 200.

In other words, the explanation is presented assuming that the projector 11 makes a transition to the state in which the functions of the projector 11 can be controlled by the pressing operation having the predetermined configuration with the pointing body 70, and the functions of the projector 11 such as the control of the brightness of the projection image and the contraction of the projection image can be controlled in this state. Here, the functions (the functions of the main unit of the projector 11) of the projector 11 denote the functions, which can be performed by the control of the projector 11 alone, and the following functions can be cited besides the functions associated with the icons 201 through 210. That is, the functions of the main unit of the projector 11 include a function of projecting the image input from the image supply section connected externally such as the PC 13, a function of projecting the image stored in advance in the storage section 105, and a function of drawing a figure and so on based on the coordinate of the pointed position 70A and then project the figure and so on thus drawn. Further, the functions of the main unit of the projector 11 also include a function of the keystone correction, a color compensation corresponding to a color mode, and so on.

Further, the function itself of displaying the menu image 200 and making a transition to the menu operation mode can be thought to be one of the functions of the main unit of the projector 11. In other words, in the case in which the pressing operation of the pointing body 70 lasts within the setting range for the preset time, the control section 103 of the projector 11 can directly control the functions of the main unit of the projector 11.

Therefore, in the case in which the pressing operation of the pointing body 70 lasts within the setting range for the preset time, it is also possible for the control section 103, for example, to directly perform the brightness control function of the projection image, or have a configuration of performing another function.

As described above, the projector 11 according to the embodiment to which the invention is applied is provided with the projection unit 3 for displaying the image based on the image data supplied from the PC 13 on the screen SC, the position detection unit 150 for detecting the operation by the pointing body 70 to the screen SC, and the operation determination section 103A, which outputs the operation information corresponding to the operation thus detected in the case in which the operation having the predetermined configuration is detected by the position detection unit 150, and controls the output of the operation information to the PC 13 corresponding to the operation having the predetermined configuration and makes the functions of the main unit of the projector 11 controllable in the case in which the operation having the predetermined configuration detected by the position detection unit 150 lasts for the time set in advance. Therefore, it becomes possible to control the functions of the main unit of the projector 11 in the case in which the operation having the predetermined configuration lasts for the time set in advance using the pointing body 70. Thus, it is possible to easily make a transition to the menu operation mode, in which the functions of the main unit of the projector 11 such as the control of the display state of the image and the change in the output destination of the coordinate of the pointed position 70A, using the operation of the pointing body 70. Further, by setting the temporal limitation, it can be prevented that the user mistakenly makes a transition to the menu operation mode. Thus, it is possible to achieve improvement in operability in the case of performing the operation using the pointing body 70.

Here, the projector 11 performs the display control using the external PC 13. In such a case, in the projector of the related art not provided with the function of displaying the menu image using the operation of pointing body 70, it results that the user is forced to perform a cumbersome work for displaying the menu image. Specifically, in order to cancel the PC mode, it is required to operate the external PC 13, and then operate the projector 11 to display the menu image on the screen SC. In contrast, according to the projector 11, it is possible to display the menu image and so on for controlling the functions of the projector 11 only by performing the operation of the pointing body 70 without performing the operation of the PC 13 and the operation panel of the projector 11.

Further, since the output destination of the operation information and the pointed position 70A is switched from the PC 13 to the image processing unit 110, it is possible to make the image processing unit 110 perform the display for controlling the functions of the projector 11 using the operation of the pointing body 70.

Further, since the operation determination section 103A makes a transition to the menu operation mode in the case in which the pointed position 70A of the pointing body 70 detected by the position detection unit 150 is kept within the range set in advance, and the duration of the operation having the predetermined configuration reaches the time set in advance, the operation for making a transition to the menu operation becomes an easy operation so specific as to be easily distinguished from other operations. Therefore, it becomes possible to assign another function to an operation having a similar configuration to the predetermined configuration providing the operation fails to reach the time set in advance, for example.

Further, since the range to be the criterion for determining that the pointed position 70A has moved can separately be set from the unit by which the position detection unit 150 can detect the pointed position 70A of the pointing body 70, the condition for detecting the operation for making a transition to the menu operation mode can flexibly be set without being limited by the specifications of the position detection unit 150.

In the configuration described above, in the case in which the position detection unit 150 detects the operation having the predetermined configuration, the operation determination section 103A can output the data representing the operation information corresponding to the operation having the predetermined configuration, namely the operation state of the operation switch 72, and the data representing the coordinate of the pointed position 70A to the PC 13, and in the case in which the operation having the predetermined configuration has lasted for the time set in advance, the operation determination section 103A can switch the output destination, to which the data described above are output, to a device other than the PC 13. In other words, it is also possible for the operation determination section 103A to directly perform the switching between the PC mode and the PJ mode without making a transition to the menu operation mode for displaying the menu image 200 in the case in which the operation having the predetermined configuration is performed.

It should be noted that the second embodiment described above is nothing more than an example of a specific aspect to which the invention is applied, and therefore, does not limit the invention. Therefore, it is also possible to apply the invention as an aspect different from the second embodiment described above. For example, the pointing body 70 can also be an operation device having a rod-like shape or a pointer such as a finger or a laser pointer besides the configuration as the pen-shaped operation device. Further, it is also possible to adopt a configuration, which is provided with a plurality of pointing devices 70 assigned with respective functions different from each other, and is capable of operating the functions different from each other using the pointing devices 70 even by the similar operation to the same operation area. Further, it is also possible to adopt a configuration capable of operating different functions even by the similar operations to the same operation area using the combinations of the pointing devices 70 having the respective types different from each other.

Further, in the second embodiment section described above, there is explained the configuration of displaying the menu image 200 when the count value of the timer 103B reaches the preset time set in advance after the operation having the predetermined configuration of the pointing body 70 has started. However, the configuration of displaying the menu image 200 by operating the pointing body 70 is not limited to this configuration. For example, it is also possible that the menu image is configured to be displayed with a variable size, and the control for changing the display configuration of the menu image is performed as described below. That is, the menu image is minimized until the operation having the predetermined configuration of the pointing body 70 is continuously performed for the preset time. From this state, the menu image can be maximized in the case in which the operation having the predetermined configuration of the pointing body 70 has lasted for the preset time.

Further, although it is assumed that the position where the menu image 200 is displayed is arbitrary in the case in which the operation having the predetermined configuration of the pointing body 70 lasts for the preset time, it is also possible to adopt the configuration of, for example, displaying the menu image 200 in the vicinity of the pointed position 70A by the pointing body 70. Thus, the user can promptly perform the operation on the menu image 200 thus displayed without moving the pointing body 70 in a long distance.

Further, in the second embodiment described above, the explanation is presented citing, as an example, the configuration in which the pressing operation of the pointing body 70 is not detected (the pressing operation is invalidated) after the transition to the menu operation mode until the release operation of the pointing body 70 is performed. However, the action of the projector 11 after the transition to the menu operation mode is not limited to this configuration. For example, it is also possible for the projector 11 to have a configuration of detecting (validating the pressing operation) the pressing operation of the pointing body 70 after the transition to the menu operation mode irrespective of the presence or absence of the release operation of the pointing body 70.

Further, in the configuration of the first and second embodiments described above, it is also possible to substitute the imaging section 153 and the shooting control section 155 provided to the position detection unit 150 with a digital camera externally connected to the projector 11. The digital camera in this case is only required to perform shooting in accordance with the control of the control section 103, and then output the shot image data to the position detection processing section 157. Further, since a general-purpose interface such as USB can be used as the interface for connecting the digital camera and the projector 11 with each other, the configuration can easily be realized.

Further, it is also possible for the imaging section 153 to have a configuration capable of imaging the invisible light (e.g., infrared light), and in the case in which the invisible light can be imaged, it is possible to adopt, for example, the configuration in which the pointing body 70 emits the invisible light, and the imaging section 153 images the invisible light emitted from the pointing body 70, and the configuration in which pointing body 70 is provided with a reflecting section capable of reflecting the invisible light, and the invisible light is projected from the projector 11 toward the screen SC due to the control by the control section 103, and then the invisible light reflected by the reflecting section of the pointing body 70 is imaged by the imaging section 153.

Further, although in the first and second embodiments described above, the explanation is presented citing, as an example, the configuration in which the light modulation device 32 uses the three transmissive liquid crystal panels corresponding to the respective colors of RGB as devices for modulating the light emitted by the light source, the invention is not limited to this example, but can also use the reflective liquid crystal panels, or can also be configured using a system including digital mirror devices (DMD), a system using one digital mirror device and a color wheel combined with each other, and so on. Here, in the case of using a single liquid crystal panel or DMD as the display section, the member corresponding to the combining optical system such as the cross dichroic prism is unnecessary. Further, besides the liquid crystal panel or the DMD, any configuration capable of modulating the light emitted from the light source can be adopted without problems. Further, a rear projection type projector in which the image light is projected from the rear side of the screen SC can also be adopted.

Further, the display device according to the invention is not limited to the projector for projecting the images to the screen SC, but various display devices including a liquid crystal monitor or a liquid crystal television set for displaying images on a liquid crystal panel, a monitor device or a television receiver for displaying images on a plasma display panel (PDP), a light emitting display device such as a monitor device or the television receiver for displaying images on an organic EL display panel called an organic light-emitting diode (OLED), an organic electroluminescence (OEL), and so on can also be included in the image display device according to the invention. In this case, the liquid crystal display panel, the plasma display panel, and the organic EL display panel each correspond to the display section, and the display screen thereof corresponds to the display surface.

Further, although in the configuration of the first and second embodiments described above, the explanation is presented citing, as an example, the configuration in which the position detection unit 150 detects the pointed position 70A by the pointing body 70 based on the shot image data, the invention is not limited to this example, but it is also possible to adopt the configuration in which, for example, a pressure-sensitive or capacitance touch panel is provided to the screen SC as the display surface or a display screen in other display systems, and the contact of a finger of the user or a rod member as the pointing body 70 is detected by the touch panel. Further, it is also possible to adopt a method of detecting the infrared signal emitted by the pointing body to thereby identify the pointed position or a method of detecting the distances to the pointing body using a plurality of devices disposed on the screen SC to thereby identify the pointed position.

Further, each of the functional sections of the display system 10 shown in FIGS. 2 and 8 is for showing the functional configuration realized by the cooperation of hardware and software, and the specific mounting configurations are not particularly limited. Therefore, it is not necessarily required to install the hardware corresponding individually to each of the functional sections, but it is obviously possible to adopt the configuration of realizing the functions of the plurality of functional sections by one processor executing the program. Further, a part of the function realized by software in the first and second embodiments described above can also be realized by hardware, or a part of the function realized by hardware can also be realized by software. Besides the above, the specific detailed configuration of each of other sections of the display system 10 including the projector 11 and the PC 13 can arbitrarily be modified within the scope or the spirit of the invention.

Further, it is also possible for the projector 11 to download the control program 105A, which is stored in the storage section 105 in the first and second embodiments described above, from another device connected via the communication network, and then execute the control program, or it is also possible to adopt the configuration of recording the control program 105A on a portable recording medium, retrieving each of the programs from the recording medium, and then executing the program.

In the first and second embodiments, as the detection method of the pointed position by the position detection processing section 157, it is possible to adopt a variety of methods besides the method of detecting the light emitted by the pointing body 70 and the method of detecting the finger by analyzing the shot image data and then identifying the tip position of the finger as the pointed position. For example, it is also possible to arrange that an infrared beam is emitted toward the display surface (the screen SC), which also functions as the operation surface of the pointing body, or in parallel to the display surface, and the tip position (the pointed position) of the pointing body is detected based on the reflected light of the infrared beam.

What is claimed is:
1. A display device that displays, on a display surface, an image based on image data supplied from an image supply section, the display device comprising:
　at least one processor that executes one or more programs to realize one or more functions of:
　a position detection unit adapted to detect an operation with a pointing body to the display surface;
　an output device adapted to output a position where the operation is performed as a pointed position when the operation is detected by the position detection unit;
　an image processing unit adapted to receive the pointed position from the output device and draw a figure so as to be superimposed on the image based on the pointed position; and
　a control section adapted to stop output of the pointed position by the output device when the operation detected by the position detection unit is an operation satisfying a condition set in advance, wherein,
　when the operation detected by the position detection unit is the operation satisfying the condition, the control section performs an image moving function of translating a position of the image from an original position to a translated position in accordance with a moving direction and a moving amount of the pointing body, the moving amount comprising a distance of a movement of the pointing body while the operation satisfying the condition is performed, translating a position of the figure in accordance with the moving direction and the moving amount of the pointing body such that the figure is superimposed on the image at a same position relative to the image both before and after the translating of the position of the image, and keeping the image and the figure at their respective translated positions after the operation satisfying the condition is no longer detected, and after performing the image moving function, the control section resumes the output of the pointed position and the image processing unit draws an additional figure based on the pointed position so as to be superimposed on the figure and the image displayed at their translated positions displayed by the display device after performing the image moving function.

2. The display device according to claim 1, wherein when the operation detected by the position detection unit is the operation satisfying the condition, the control section performs a function of changing a display state of the image by the display device.

3. The display device according to claim 2, wherein the position detection unit detects at least one finger of a user as the pointing body.

4. The display device according to claim 3, wherein the control section changes the function performed based on a number of fingers detected by the position detection unit.

5. The display device according to claim 1, wherein the operation satisfying the condition is an operation having a trajectory of the pointed position having a predetermined shape.

6. A method of controlling a display device adapted to display an image based on image data supplied from an image supply section on a display surface, the method comprising:

detecting, by the display device, an operation with a pointing body to the display surface;

outputting, by the display device when the operation is detected, a position where the operation is detected as a pointed position;

receiving, by the display device, output of the pointed position and drawing a figure so as to be superimposed on the image based on the pointed position;

stopping, by the display device, output of the pointed position when the operation detected is an operation satisfying a condition set in advance;

performing, by the display device when the operation detected is the operation satisfying the condition, an image moving function of translating a position of the image from an original position to a translated position in accordance with a moving direction and a moving amount of the pointing body, the moving amount comprising a distance of a movement of the pointing body while the operation satisfying the condition is performed, translating a position of the figure in accordance with the moving direction and the moving amount of the pointing body such that the figure is superimposed on the image at a same position relative to the image both before and after the translating of the position of the image, and keeping the image and the figure at their respective translated positions after the operation satisfying the condition is no longer detected; and after performing the image moving function, resuming, by the display device, the output of the pointed position and drawing an additional figure based on the pointed position so as to be superimposed on the figure and the image displayed at their translated positions displayed by the display device after performing the image moving function.

* * * * *